United States Patent [19]

Wei

[11] Patent Number: 5,526,977
[45] Date of Patent: Jun. 18, 1996

[54] METHOD FOR FABRICATING A BIMETAL VEHICLE WHEEL

[75] Inventor: Daniel C. Wei, Ann Arbor, Mich.

[73] Assignee: Hayes Wheels International, Inc., Romulus, Mich.

[21] Appl. No.: 356,762

[22] Filed: Dec. 15, 1994

[51] Int. Cl.$^6$ ................................................. B23K 31/02
[52] U.S. Cl. .......................... 228/208; 228/254; 228/261; 29/894.322
[58] Field of Search ..................................... 228/182, 208, 228/210, 225, 253, 254, 261; 29/894, 894.322

[56] References Cited

U.S. PATENT DOCUMENTS

| | | | |
|---|---|---|---|
| 3,186,045 | 6/1965 | Lagostina | 164/100 |
| 4,363,347 | 12/1982 | Baumgartner | 29/894.322 |
| 4,592,120 | 6/1986 | Egan et al. | 164/100 |
| 4,911,353 | 3/1990 | Deakin | 228/261 |
| 4,961,528 | 10/1990 | Peters | 228/261 |
| 4,980,123 | 12/1990 | Gedeon et al. | 164/100 |
| 5,070,228 | 12/1991 | Siemers et al. | |
| 5,080,056 | 1/1992 | Kramer et al. | |
| 5,109,150 | 4/1992 | Rogers | |
| 5,271,967 | 12/1993 | Kramer et al. | |

FOREIGN PATENT DOCUMENTS

| | | |
|---|---|---|
| 3722257 | 1/1989 | Germany. |
| 4124423 | 2/1992 | Germany. |
| 64-18574 | 1/1989 | Japan ..................... 228/261 |
| 1127184 | 5/1989 | Japan ..................... 228/261 |

OTHER PUBLICATIONS

Thermal Spraying: Practice, Theory, and Application, American Welding Society, 1985, pp. 6–11, 16, 54–68 and 94.

*Primary Examiner*—Samuel M. Heinrich
*Attorney, Agent, or Firm*—MacMillan, Sobanski & Todd

[57] ABSTRACT

A method for attaching a metal wheel disc to a wheel rim formed from a metal which is dissimilar to the wheel disc metal. A layer of metal which is compatible for welding to the metal forming the wheel disc is thermally sprayed onto an outboard portion of the wheel rim to form a weld anchor. The wheel disc is positioned adjacent to the sprayed metal layer and welded thereto. The wheel disc also can be cast or forged over the sprayed metal layer with the wheel disc bonding to the sprayed metal layer to form a secure air-tight seal between the wheel disc and the wheel rim. Alternately, a metal filler compatible with both the metals forming the wheel disc and wheel rim is thermally sprayed onto the wheel rim and the wheel disc brazed thereto.

12 Claims, 16 Drawing Sheets

METHOD FOR FABRICATING A BIMETAL VEHICLE WHEEL

BACKGROUND OF THE INVENTION

The invention relates in general to vehicle wheels and in particular to a method for fabricating a bimetal vehicle wheel.

Vehicle wheels include an annular wheel rim which is adapted to carry a pneumatic tire. A circular wheel disc is typically formed across an end of the wheel rim. Alternatively, the wheel disc can be recessed within the wheel rim. The wheel disc includes a wheel hub having a central pilot hole and a plurally of wheel stud holes formed therethrough for mounting the wheel upon a vehicle. Typically, the wheel disc also includes a plurality of wheel spokes connecting the wheel hub to the wheel rim.

In the past, vehicle wheels have been fabricated by attaching a stamped steel wheel disc to a rolled steel wheel rim. Also in the past, vehicle wheels have been cast from molten steel alloys or forged from steel alloy billets. Increasingly, vehicle wheels are being formed from light weight metals, such as aluminum, magnesium, titanium, or alloys thereof. Such light weight wheels can be formed with the wheel disc having a pleasing aesthetic shape. The wheel disc outer surface is typically machined to form a smooth surface which can be subsequently finished with a decorative high luster. It is known to form light weight wheels from a one-piece casting or forging. Alternately, light weight wheels can be assembled by attaching a wheel disc to a wheel rim or a full faced wheel disk to a partial wheel rim.

An assembled light weight wheel having a wheel disc and rim formed from dissimilar metals is known as a bimetal wheel. For example, a full faced wheel disc cast or forged from an aluminum alloy and having a specific shape can be welded to a partial wheel rim rolled from a steel alloy. In this example, the use of the aluminum alloy wheel disc allows styling of the visible portion of the assembled wheel while the use of the steel alloy wheel rim reduces the cost of the wheel. To facilitate welding the steel alloy wheel rim to the aluminum alloy wheel disc, it is known to cast a steel alloy weld anchor into the wheel disc. A portion of the weld anchor remains exposed and forms at least a portion of the surface of the wheel disc which contacts the wheel rim. The wheel rim is welded to the weld anchor with the weld anchor providing a compatible material for forming a weld with the steel wheel rim.

SUMMARY OF THE INVENTION

This invention relates to a method for joining together two components formed from dissimilar metals which includes thermally spraying a metal onto a portion of a surface of one of components which is compatible with the metal forming the other component to form a surface for attachment of the other component. For example, the one of the components can be a wheel disc formed from a first metal and the other component can be a wheel rim formed from a second metal which is different from the first metal.

The method includes providing first and second components formed from dissimilar metals. A layer of metal, which is compatible in a welding sense with the metal forming the second component, is deposited with a thermal spray gun onto a portion of a surface of the first component to form a weld anchor. The second component is attached to the first component by welding the second component to the weld anchor.

Alternately, a layer of metal which is dissimilar to the metal forming the first component is thermally deposited with a thermal spray gun onto the surface of a portion of the first component. The first component is positioned in a mold which is used to cast the second component. The first component is positioned in the mold such that the portion which includes the thermally deposited metal layer extends into the mold cavity. Molten metal which is compatible with the thermally deposited metal is poured into the mold to cast the second component. The molten metal covers at least a portion of the thermally deposited metal layer. Upon cooling, the cast second component bonds to the thermally deposited metal layer to form a secure air-tight seal between the two components.

Similarly, after thermally depositing a layer of dissimilar metal with a thermal spray gun on the surface of a portion of the first component, the first component can be mounted on one of the members of a die set which is used to forge the second component. The first component is mounted on the die set such that the portion which includes the thermally deposited surface extends into the die set cavity. A heated billet of a metal which is compatible with the thermally deposited metal is inserted between the dies and dies closed, forging the second component over the sprayed portion of the first component. During forging, the billet is forced by the compression of the dies to cover at least a portion of thermally deposited metal layer. Upon cooling, the forging bonds to the thermally deposited metal layer to form a secure air-tight seal between the two components.

The invention further contemplates a method for brazing together two components formed from dissimilar metals. A layer of brazing filler metal which is compatible with both of the metals forming the two components is thermally sprayed onto a portion of a surface of one of the components. The second component is positioned in contact with the thermally sprayed metal layer to form an assembly. The assembly is heated to a brazing temperature which is sufficient to melt the layer of filler metal, but not the components. Upon cooling, the melted filler material forms a bond between the two components.

Objects and advantages of the invention will become apparent from the following detailed description of the invention and the accompanying drawings.

DETAILED DESCRIPTION OF THE PREFERRED EMBODIMENT

Figure 1:
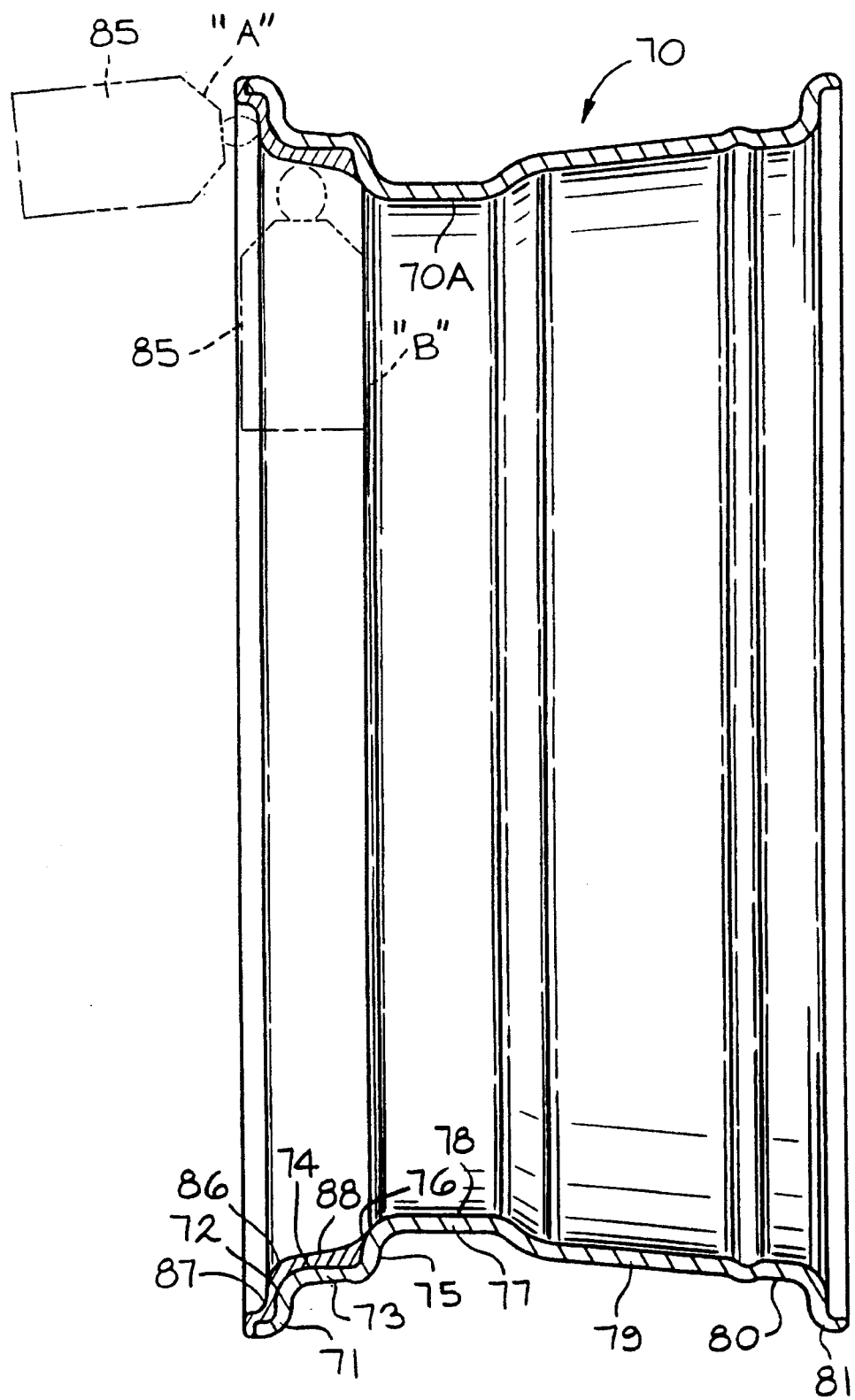
FIG. 1 illustrates forming a weld anchor on an inner surface of a wheel rim in accordance with the invention.

Referring now to the drawings, there is shown in FIG. 1 a cross section view of a full wheel rim 70. In the preferred embodiment of the invention, the wheel rim 70 is formed from steel by a conventional process, such as butt welding the ends of a strip of steel to form a hoop and rolling or spinning the hoop to a final shape. The rim 70 has an inner surface 70A and includes a ring shaped outboard tire bead retaining flange 71 which defines an outboard flange surface 72. The bead retaining flange 71 is contiguous to an annular outboard tire bead seat 73. The bead seat 73 defines an inner surface 74. The outboard bead seat 73 is contiguous with a radial outboard drop well wall 75 which defines an outboard surface 76. The drop well wall 75 is contiguous with an annular drop well 77, which defines an inner surface 78. The drop well 77 extends axially to an annular rim leg portion 79. The inboard end of the leg portion 79 terminates in an annular inboard tire bead seat 80. A ring shaped inboard tire bead retaining flange 81 is formed on the inboard end of the inboard tire bead seat 80.

The present invention contemplates using a thermal spray gun to deposit a layer of metal on a portion of the surface of the wheel rim 70 to form a weld anchor. As will be explained below, a wheel disc formed from a metal which is different from the wheel rim metal is welded to the weld anchor to form a bimetal vehicle wheel. Accordingly, the weld anchor is formed from a metal which is compatible with the wheel disc metal. The invention also contemplates enhancing the appearance of the assembled bimetal vehicle wheel by extending the thermally sprayed layer of metal across any visible portion of the wheel rim 70.

The portion of the wheel rim inner surface 70A which is to be sprayed is cleaned of any dirt, oil and oxides to assure a good bond between the sprayed metal and the surface. Cleaning can include conventional steps, such as immersion of the wheel rim in a solvent to remove dirt and oil, immersion in a chemical bath to remove oxides and rinsing to remove any solvent and chemicals. The rinse can be by immersion in a water bath or by flushing with a water jet.

A thermal spray gun 85 sprays a layer of metal 86 onto the cleaned portion of the rim inner surface. In the preferred embodiment, an arc plasma spray gun is used to deposit the layer of metal on the wheel rim 70.

Figure 2:
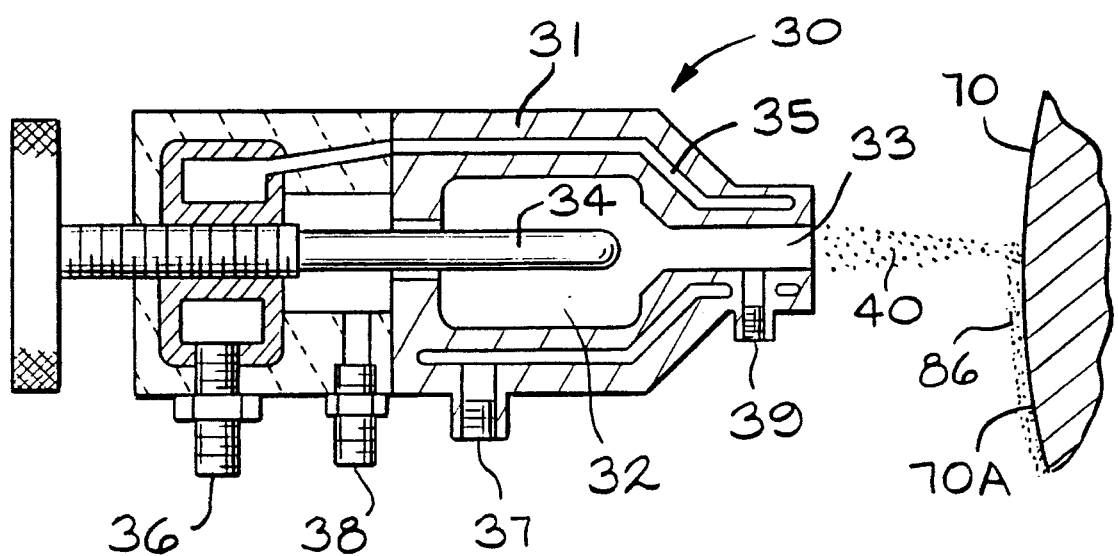
FIG. 2 is a sectional view of an arc plasma spray gun used to deposit the weld anchor shown in FIG. 1.

A sectional view of a typical arc plasma spray gun 30 is shown in FIG. 2. The arc plasma spray gun 30 includes a housing 31 that defines a cylindrically shaped arc chamber 32 and also forms a first electrode. A nozzle 33 connects the arc chamber 32 to the atmosphere. A second electrode 34 extends axially into the arc chamber 32. The housing 31 includes an internal cooling passage 35 formed therein which conveys cooling water around the arc chamber 32 to cool the housing 31. A cooling water inlet port 36 connects the cooling water passage 35 with a supply of cooling water (not shown) while a cooling water outlet port 37 connects the cooling passage 35 with a water discharge hose (not shown). Cooling water is circulated through the cooling passage 35 when the spray gun 30 is operated. A gas inlet port 38 connects the arc chamber 32 to a supply of a mixture of pressurized inert gases, such as argon and nitrogen. A material inlet port 39 communicates with the nozzle 33 downstream from the arc chamber 32 and is connected to a pressurized supply of a powdered metal (not shown) that is to be sprayed onto the surface.

To operate the arc plasma spray gun 30, a DC arc (not shown) is struck between the spray gun electrodes 31 and 34. The arc has a maximum temperature of approximately 1,600° C. The arc temperature causes a rapid expansion of the inert gas mixture supplied through the gas inlet port 36 to form a plume 40 of ionized gases. The plume of ionized gases 40 is discharged through the nozzle 33. In the preferred embodiment, powdered aluminum, entrained in a carrier gas, such as helium, is injected under pressure through the material inlet port 39 into the plasma plume 40 in the nozzle 33. The reasons for using powered aluminum will be explained below. The powdered aluminum includes very small particles which are melted in plasma plume 40 to form small droplets of molten aluminum. The aluminum droplets are carried by the plasma plume 40 which is directed at a portion of the inner surface 70A of the wheel rim 70, as shown in FIG. 1. The aluminum droplets splatter onto the inner surface 70A of the wheel rim 70 to form a layer 86 of aluminum. The aluminum droplets and wheel surface cool rapidly, fusing the aluminum to the wheel rim surface 70A and causing the aluminum layer 86 to have a strong physical bond with the wheel rim surface.

As additional aluminum droplets are sprayed onto the wheel rim surface 70A, they are fused to the initially deposited aluminum to increase the thickness of the aluminum layer 86. The final thickness of the aluminum layer 86 is proportional to the applied arc power, the flow of the aluminum and the duration of the thermal spraying step.

It will be appreciated that other commercially available thermal spraying means can be used practice the invention. For example, an electric arc gun with a aluminum wire or rod fed into the plasma plume or a high velocity oxygen hydrocarbon fuel spray gun could be used to spray the aluminum droplets onto the wheel 42.

Figure 6:
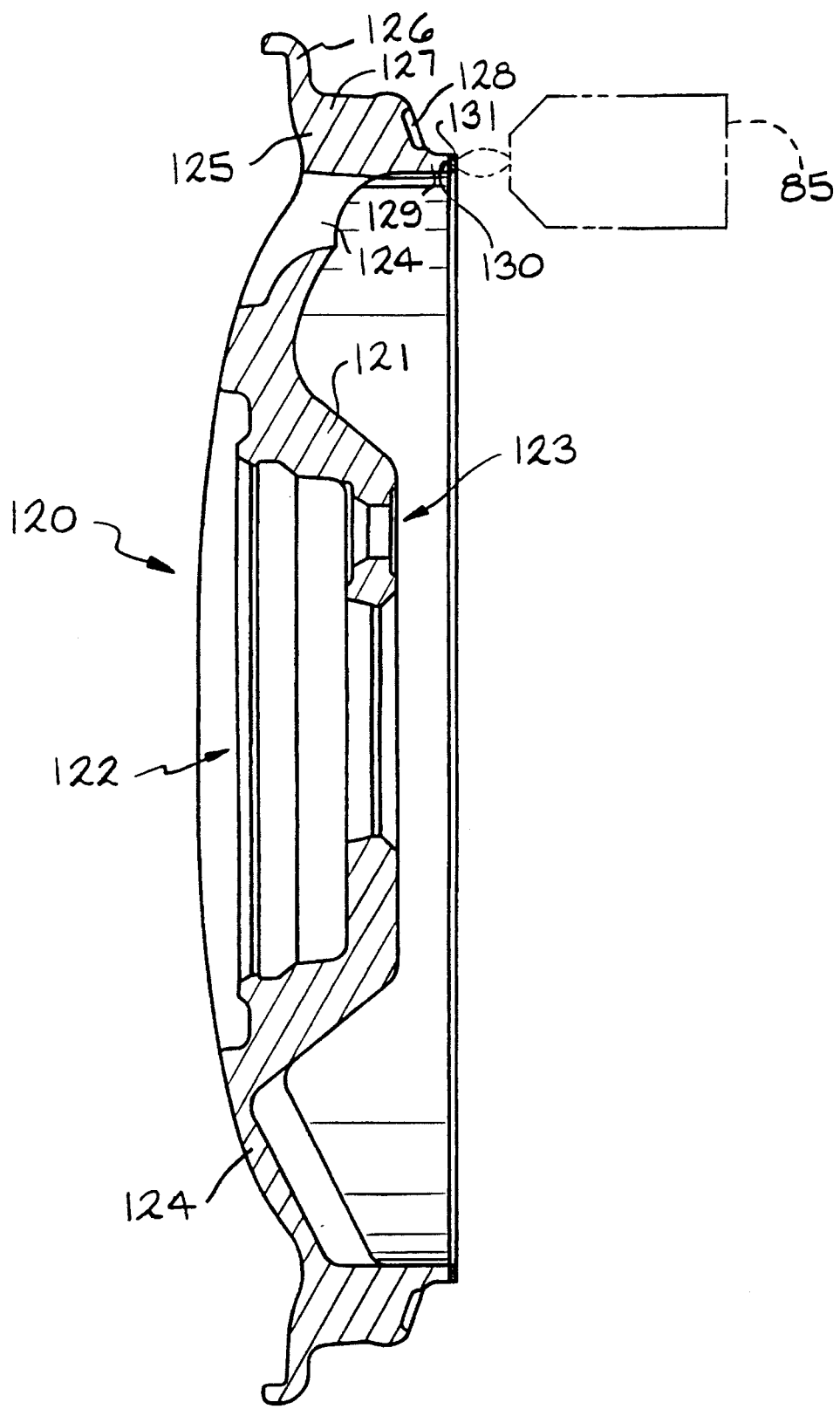
FIG. 6 illustrates forming a weld anchor on an edge surface of a portion of a deep well extending from the inboard surface of a full wheel disc in accordance with the invention.

Initially, the spray gun 85 is in a position labeled "A" in FIG. 6 to spray a first portion 87 of the metal layer 86 onto the outboard flange surface 72 of the outboard tire bead retaining flange 71. The spray gun 85 can be rotated and translated axially to a second position labeled "B" to spray a second portion 88 of the metal layer 86 over the inner surface 74 of the outboard tire bead seat 73. During spraying, the wheel rim 70 is rotated about its axis. To enhance uniformity of the sprayed metal layer 86, the spray gun 85 can be mounted upon a robotic arm (not shown). The robotic arm is controlled to follow the surface contours of the wheel rim 70 and to maintain a predetermined distance between the spray gun nozzle (not shown) and the wheel rim surface as the gun moves axially. As shown in FIG. 1, the metal layer 86 extends onto the outboard surface 76 of the drop well 77 to form a weld anchor 88. The weld anchor 88 is formed having a greater thickness than the first portion 87 of the sprayed metal layer 86.

It will be appreciated that the metal layer 86 can extend partially across the inner surface 70A of the wheel rim 70 to cover those portions of the inner surface which are visible after the wheel disc is attached to the wheel rim 70. Alternately the metal layer 86 can extend axially across the entire inner surface 70A of the wheel rim 70.

As indicated above, the applied layer thickness is a function of the applied arc power, the rate of feed for the material being sprayed and the duration of the thermal spraying. If the dimensions of the wheel are critical, the metal surface can be built up with a thick sprayed metal layer which is subsequently machined to the final shape. This machining operation is an optional step which can be used to compensate for dimensional variations inherent in the wheel fabrication process or to match a machined surface on the wheel disk that is to be attached to the wheel rim 70. Similarly, the metal layer 86 can be polished to a high luster, however, polishing is also optional.

Figure 3:
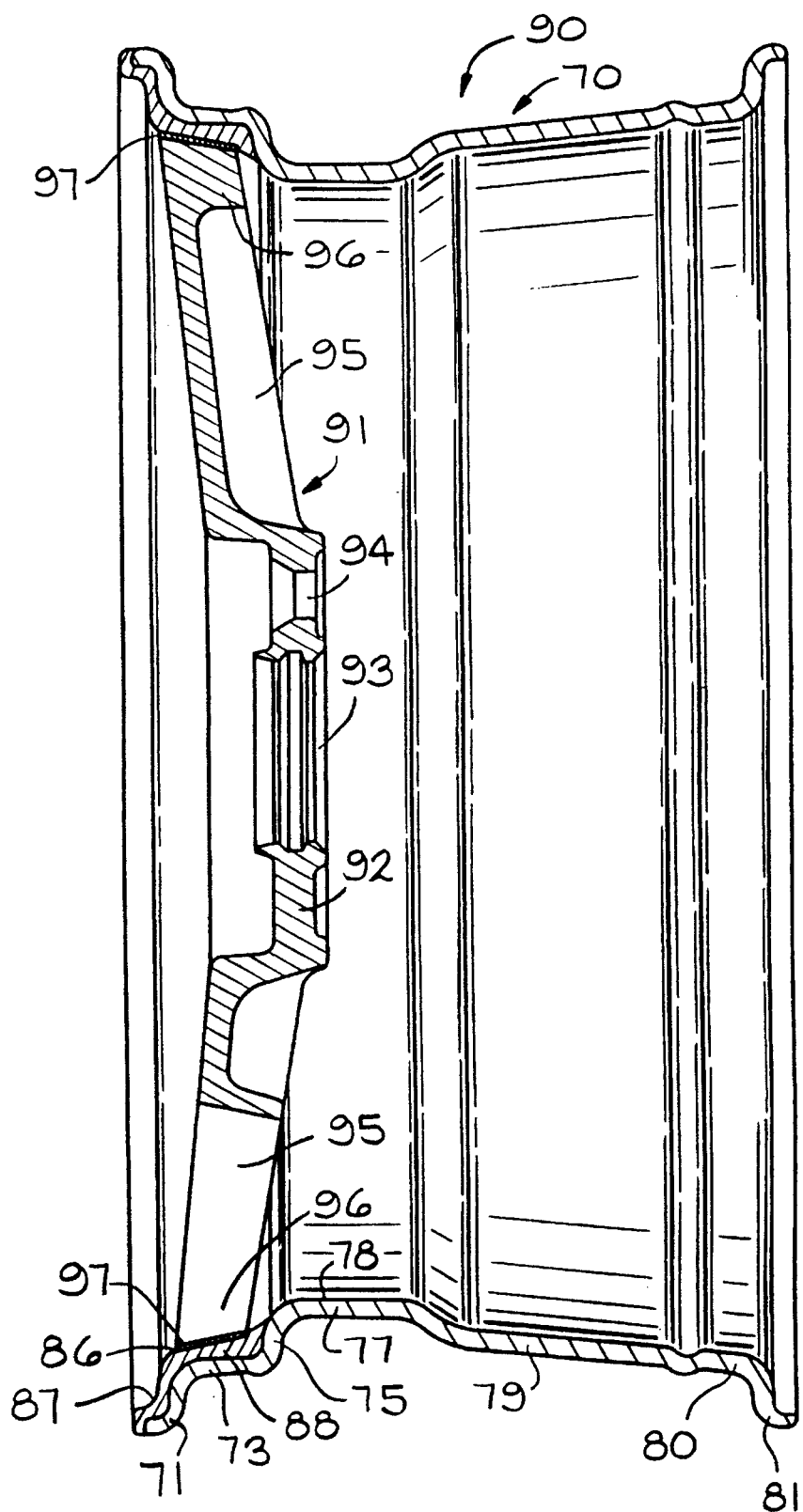
FIG. 3 shows a wheel spider welded to the wheel rim shown in FIG. 1.

A section view of an assembled bimetal vehicle wheel 90 which was formed in accordance with the invention is shown in FIG. 3. The wheel 90 includes the wheel rim 70. The identification numerals used in FIG. 3 to identify portions of the wheel rim 70 are the same as used in FIG. 1. A wheel disc 91, which in the preferred embodiment is formed from aluminum or an aluminum alloy by a conventional means, such as casting or forging, is disposed in the outboard portion of the wheel rim 70. The wheel disc 91 includes a central hub 92 which has a central pilot hole 93 and a plurality of wheel stud holes 94, only one of which is shown, formed therethrough. A plurality of spokes 95, two of which are shown, extend radially outward from the hub 92 to the wheel rim 70. Each wheel spoke 95 terminates in an outer portion 96 which contacts the second portion 88 of the wheel rim metal layer 86. Thus, the wheel disc 91 defines a wheel spider.

The wheel disc 91 is secured to the wheel rim 70 by welding the spoke end portions 96 to the inner surface 74 of the outboard tire bead seat 73. The welds 97 are formed between the spoke end portions 96 and the weld anchor 88. The welds 97 can consist of a single spot weld on the end of each wheel spoke 96. Alternately, the welds 97 can extend around the circumference of the spoke ends 96 or be formed as a butt joint along the interface between the spoke end portions 96 and the weld anchor 88. Because the weld anchor 88 is formed from aluminum or an aluminum alloy which matches the metal used to forth the wheel disc 91, the welds 97 securing the end portions 96 of the aluminum wheel spokes 95 to the weld anchor 88 are easily formed. Furthermore, as explained above, thermal spraying the metal layer 86 onto the wheel rim 70 assures that the weld anchor 88 is securely attached to the surface of the wheel rim 70.

As indicated above, the weld anchor 88 is formed thicker than the first portion 87 of the metal layer 86. However, depending upon the specific conditions, the weld anchor 88 may have the same thickness as the first portion 87. Additionally, while the weld anchor 88 has been described as being a continuous circumferential ring, it as also possible to form an individual weld anchor (not shown) that corresponds to each wheel spoke end portion 96. Such individual weld anchors would be equally spaced about the circumference of the inner surface 74 of the outboard tire bead seat 73. While use of individual weld anchors would reduce the amount of metal sprayed onto the wheel rim 70, careful alignment of the wheel disk spokes 95 with the welding anchors would be required when the wheel 90 is assembled.

While the thermally deposited metal layer 86 and the wheel disc 91 have been described above as being formed from aluminum, it will be appreciated that other metals and metal alloys can be used to practice the invention. Generally, the metal sprayed onto the wheel rim to form the metal layer 86 must be compatible for welding to the metal used to form the wheel disc 91 in the sense of being weldable thereto. Accordingly, an alloy of the wheel disc material can be used, as long as welding compatibility exists. Machining or polishing of the first portion 87 of the metal layer 86 assures that the visible portion of the wheel rim 70 visually matches the wheel disc 91. Thus, the wheel 90 appears to be formed entirely from the metal used to form the wheel disc 91.

It will be further appreciated that the above method of wheel assembly can be applied to any bimetal wheel. Thus, the wheel rim 70 can be formed by other conventional processes, such as casting or forging. Additionally, while the wheel rim 70 has been described as being formed from steel, the rim 70 also can be formed from a light weight metal or alloy thereof which differs from the metal used to form the wheel disc 91. Similarly, while the wheel disc 91 was described above as being formed from aluminum or an aluminum alloy, it will be appreciated that other light weight metals, such as magnesium or titanium, or alloys thereof can be used to form the wheel disc 91.

Figure 4:
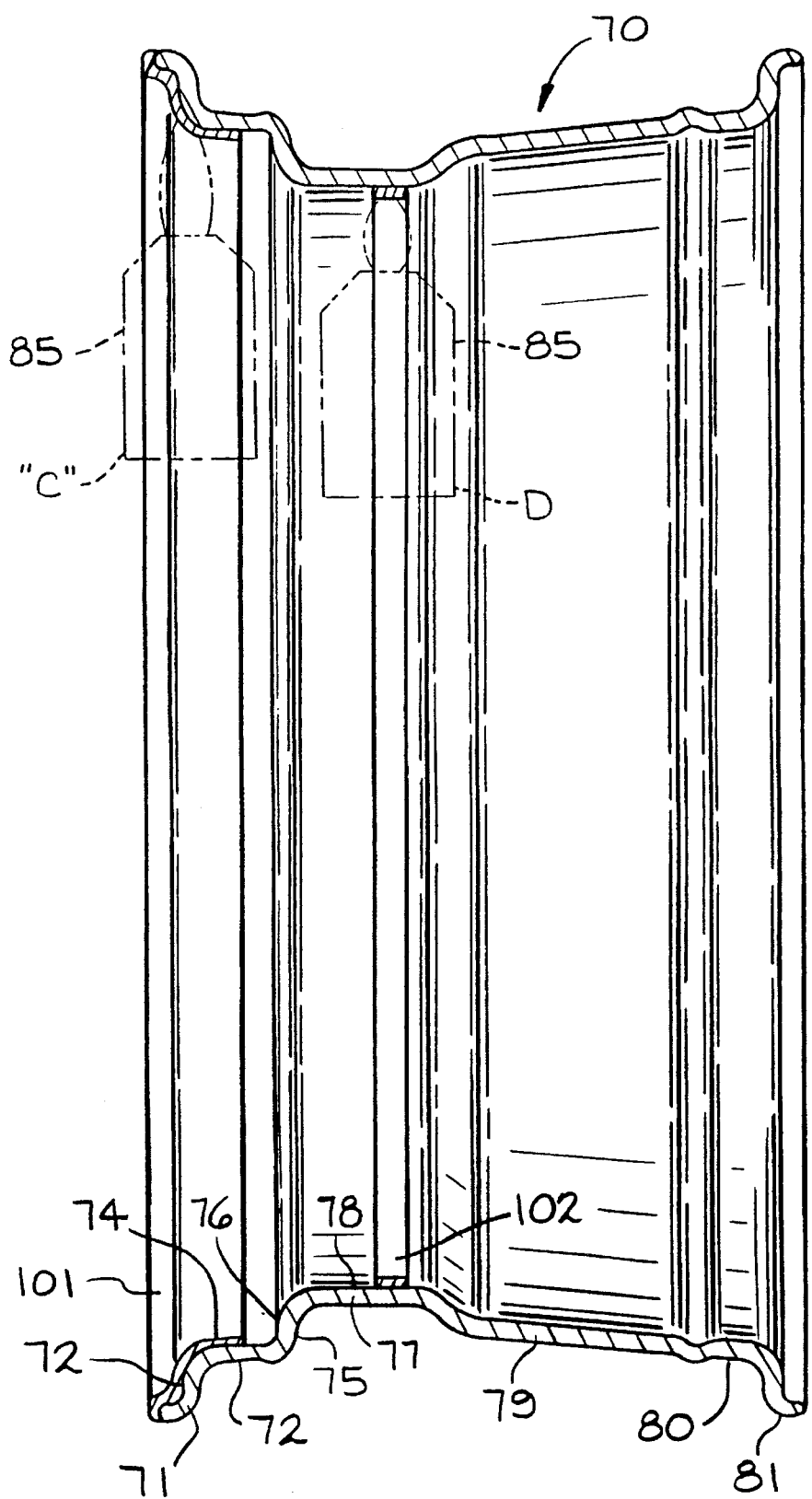
FIG. 4 illustrates forming a weld anchor on the inner surface of a wheel rim drop well in accordance with the invention.
Figure 5:
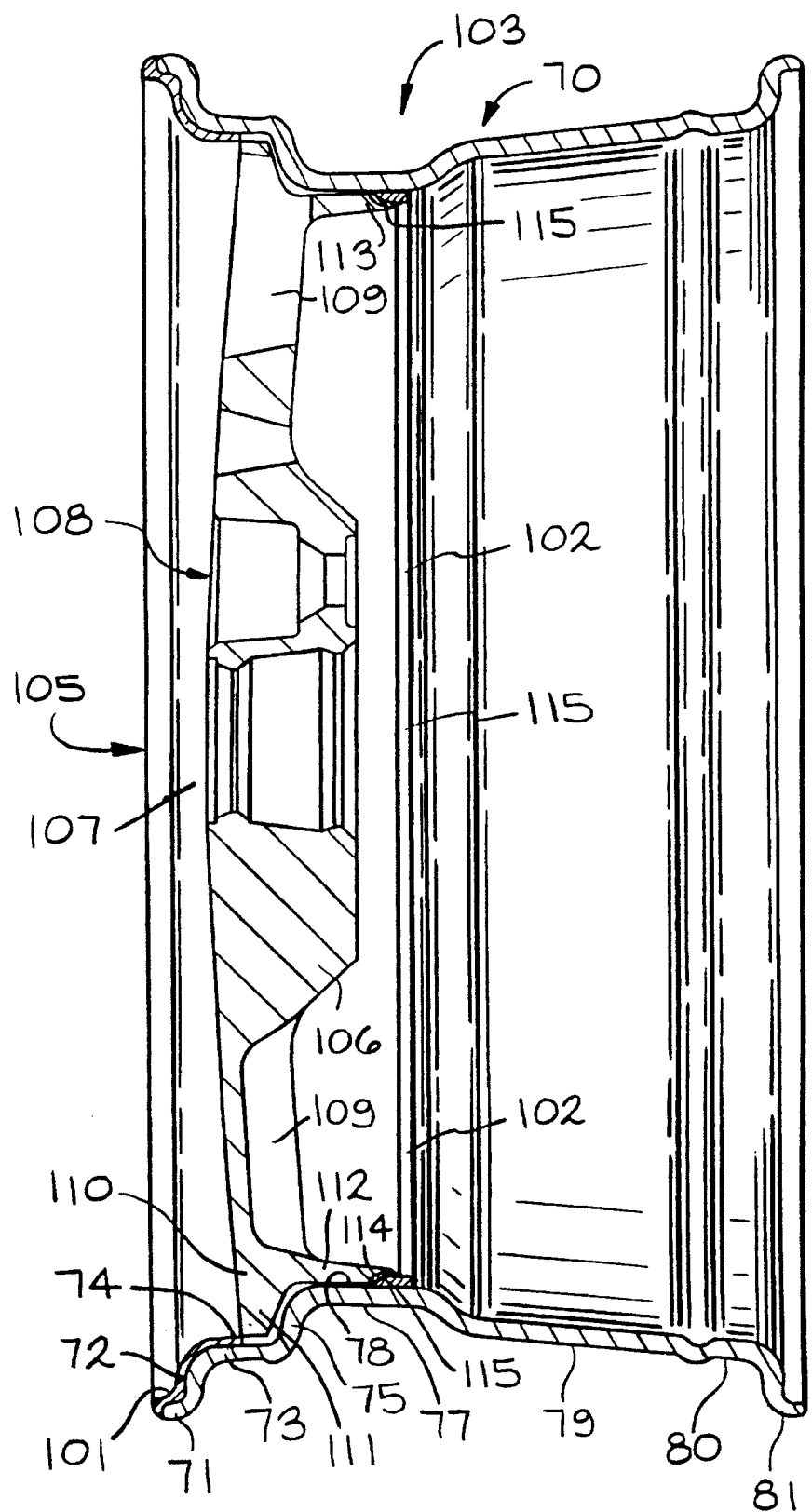
FIG. 5 shows a wheel disc welded to the wheel rim shown in FIG. 4.

An alternate embodiment of the above method for fabricating a bimetal vehicle wheel is illustrated in FIGS. 4 and 5. For illustrative purposes, the same steel rim 70 shown in FIGS. 1 and 3 is used. A sectional view of the wheel rim 70 is shown in FIG. 4. The portions of the wheel rim 70 are labeled with the same numeric designators used in FIG. 2. In the preferred embodiment, a thermal spray gun 85 is used to form two separate layers of sprayed aluminum or aluminum alloy on the inner surface of the wheel rim 70.

A ring shaped outer layer 101 is formed with the spray gun 85 traversing axially from the position labeled "C" while the rim 70 is rotated about its axis. The first ring 101 extends radially across the outboard surface 72 of the outboard tire bead retaining flange 71 and axially across a portion of the inner surface 74 of the outboard tire bead seat 73. As described above, the first ring 101 can be machined and/or polished to match the wheel disc, however, these steps are optional.

The ring shaped weld anchor 102 is formed with the spray gun 85 traversing axially from the position labeled "D" while the rim 70 is rotated about its axis. The weld anchor 102 extends axially across a portion of the inner surface 78 of the drop well and is machined as required by wheel disc tolerances.

A sectional view of an assembled bimetal vehicle wheel 103 is shown in FIG. 5. The wheel 103 includes a wheel disc 105, which, in the preferred embodiment, is formed from aluminum or an aluminum alloy by a conventional means, such as casting or forging. The wheel disc 105 is disposed in the outboard end of the wheel rim 70. The wheel disc 105 includes a wheel hub 106 which has a central pilot hole 107 and a plurality of wheel stud holes 108, only one of which is shown, formed therethrough. A plurality of spokes 109, two of which are shown extend radially outward from the hub 106 to an annular disc rim 110. The wheel disc rim 110 includes an outboard portion 111 and an inboard portion 112. The inboard portion 112 extends axially into the wheel rim 70 and terminates in an annular edge portion 113. The annular edge portion 113 also includes an optional annular recess 114 formed in the outer surface thereof to provide clearance for the weld anchor 102 during assembly of the wheel 103. When the wheel 103 is assembled, the inboard portion 112 of the wheel disc rim 110 is supported by the inner surface 78 of the drop well 77.

The wheel disc 105 is secured to the wheel rim 70 with at least one spot weld 115. In the preferred embodiment, a plurality of spot welds 115, three of which are shown in FIG. 5, are used. The spot welds 115 are equally spaced circumferentially about the annular edge portion 113. The welds 115 are formed between the annular edge portion 113 and the weld anchor 102. Because the rim 70 is formed as an air tight subassembly, an air tight seal is not needed between the wheel disc rim 110 and the wheel rim 70. However, the invention can also be practiced by forming a continuous circumferential weld about the disc annular edge portion 113.

While the wheel 103 has been described as having a steel rim 70, it will be appreciated that the wheel rim 70 can be formed from a metal or alloy other than steel. Additionally, the wheel disc 105 can be formed from other light weight metals, such as magnesium and titanium or alloys thereof. Accordingly, the sprayed metal forming the weld anchor 102 is selected to be compatible with the metal used to form the wheel disc 105.

Figure 7:
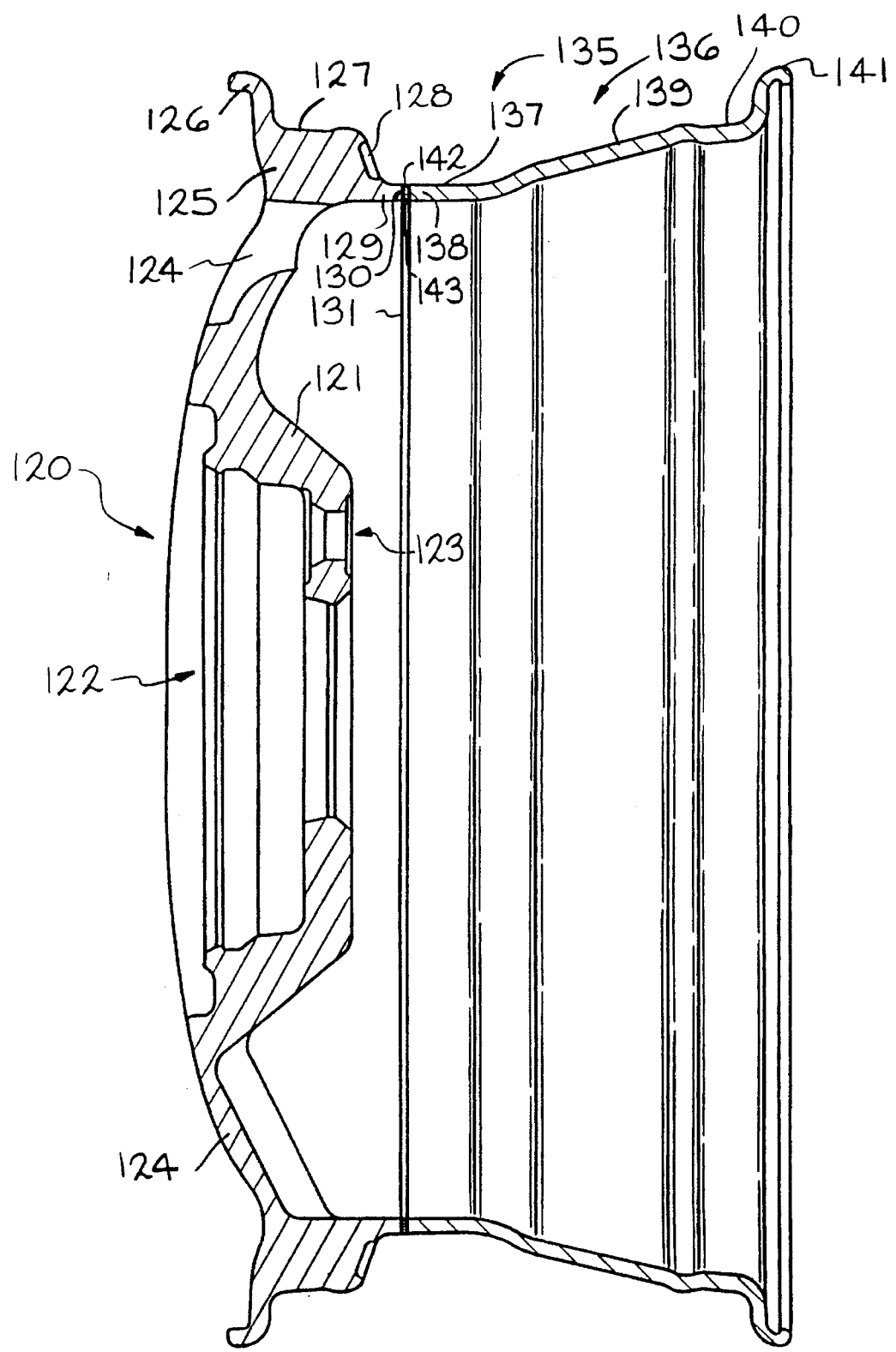
FIG. 7 shows a partial wheel rim welded to the wheel disc shown in FIG. 6.

Another embodiment of the invention which contemplates thermally depositing a weld anchor on full face wheel disc is illustrated in FIGS. 6 and 7. FIG. 6 shows a sectional view of a full face wheel disc 120 which is formed from aluminum, or an alloy of aluminum by a conventional process, such as casting or forging. The wheel disc 120 includes a wheel hub 121 which has a central pilot hole 122 and a plurality of wheel stud holes 123, only one of which is shown, formed therethrough. A plurality of spokes 124, two of which are shown, extend radially outward from the hub 121 to an annular disc rim 125. The wheel disc rim 125 is formed to include an outboard tire bead retaining flange 126, an outboard tire bead seat 127, a drop well wall 128 and a portion of a drop well 129. The inboard end of the drop well portion 129 forms an annular edge 130.

An annular weld anchor 131 is formed on the annular edge 130 of the wheel disc 120 with a thermal spray gun 85, shown in phantom in FIG. 6. In the preferred embodiment, a powered ferrous material is supplied to the thermal spray gun 85 to form a weld anchor 131 that is compatible for welding to a steel partial wheel rim. The thermal spray gun 85 can be held stationary while the wheel disc 120 is rotated about its axis to form the weld anchor 131.

A sectional view of an assembled full face vehicle wheel 135 is shown in FIG. 7 which includes a partial wheel rim 136. In the preferred embodiment, the partial wheel rim 136 is formed from steel stock by a conventional process, as described above. The partial wheel rim 136 includes a portion 137 of the drop well having an axially outward directed end terminating in an annular shaped outer edge 138. The drop well portion 137 extends axially to an annular rim leg portion 139. The inboard end of the leg portion 139 terminates in an annular inboard tire bead seat 140. A ring shaped inboard tire bead retaining flange 141 is formed on the inboard end of the inboard tire bead seat 140.

To assemble the vehicle wheel 135, the wheel rim 136 is positioned coaxially with the full face wheel disc 120 with the inboard tire bead retaining flange 141 parallel to the outboard tire bead retaining flange 126 and the wheel rim outer edge 138 abutting the weld anchor 131. The wheel rim 136 is secured to the wheel disc 120 with a continuous circumferential butt weld formed between the wheel rim outer edge 138 and the weld anchor 131. The wheel 135 illustrated in FIG. 7 has an outer weld 142 and an inner weld 143. However, it will be appreciated that the wheel 135 can be assembled with only one weld, either the outer weld 142 or the inner weld 143. It may be desirable to grind or machine the outer weld 142 flush with the outer surface of the drop well 137, however this step is optional. The weld must be air tight to prevent air leakage when a tire is mounted upon the wheel 135.

Because of the strong physical bond formed between the thermally sprayed weld anchor 131 and the wheel disc 120, leakage of air past the weld anchor is expected to be less than the air leakage typically experienced with prior art weld anchors that are cast or forged into the wheel disc.

While the vehicle wheel 135 has been described as having a steel partial rim 136, it will be appreciated that the wheel rim 136 also can be formed from a light weight metal or alloy thereof which is dissimilar to the metal used to form the wheel disc 120. In such situations, the weld anchor 131 is formed from a metal that is compatible with the metal used to form the wheel rim 136. Furthermore, the wheel rim 135 can be formed by a casting forging operation. Similarly, the wheel disc 120 can be formed from other light weight metals or alloys than aluminum. Additionally, while the invention has been illustrated with the weld anchor 131 formed on the wheel disc 120, the weld anchor can, as an alternative, be formed upon the wheel rim 136. For example, if the wheel disc 120 is formed from an aluminum alloy and the wheel rim from steel, a layer of aluminum or aluminum alloy can be sprayed onto the wheel rim outer edge 138 to form a weld anchor (not shown). The sprayed aluminum adheres to the steel wheel rim 136 forming a weld anchor thereon to which the wheel disc 120 can be welded.

Figure 8:
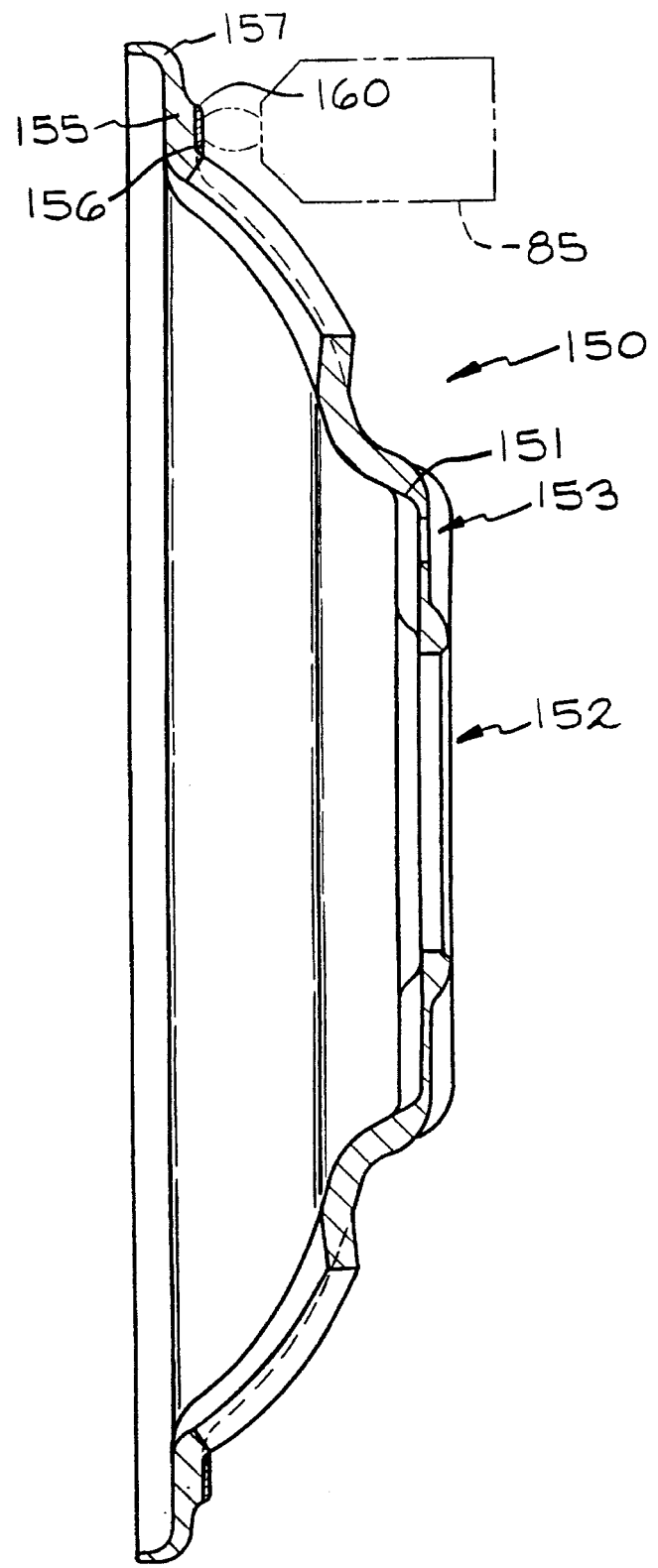
FIG. 8 illustrates forming an annular weld anchor on the inboard surface of a full wheel disc in accordance with the invention.
Figure 9:
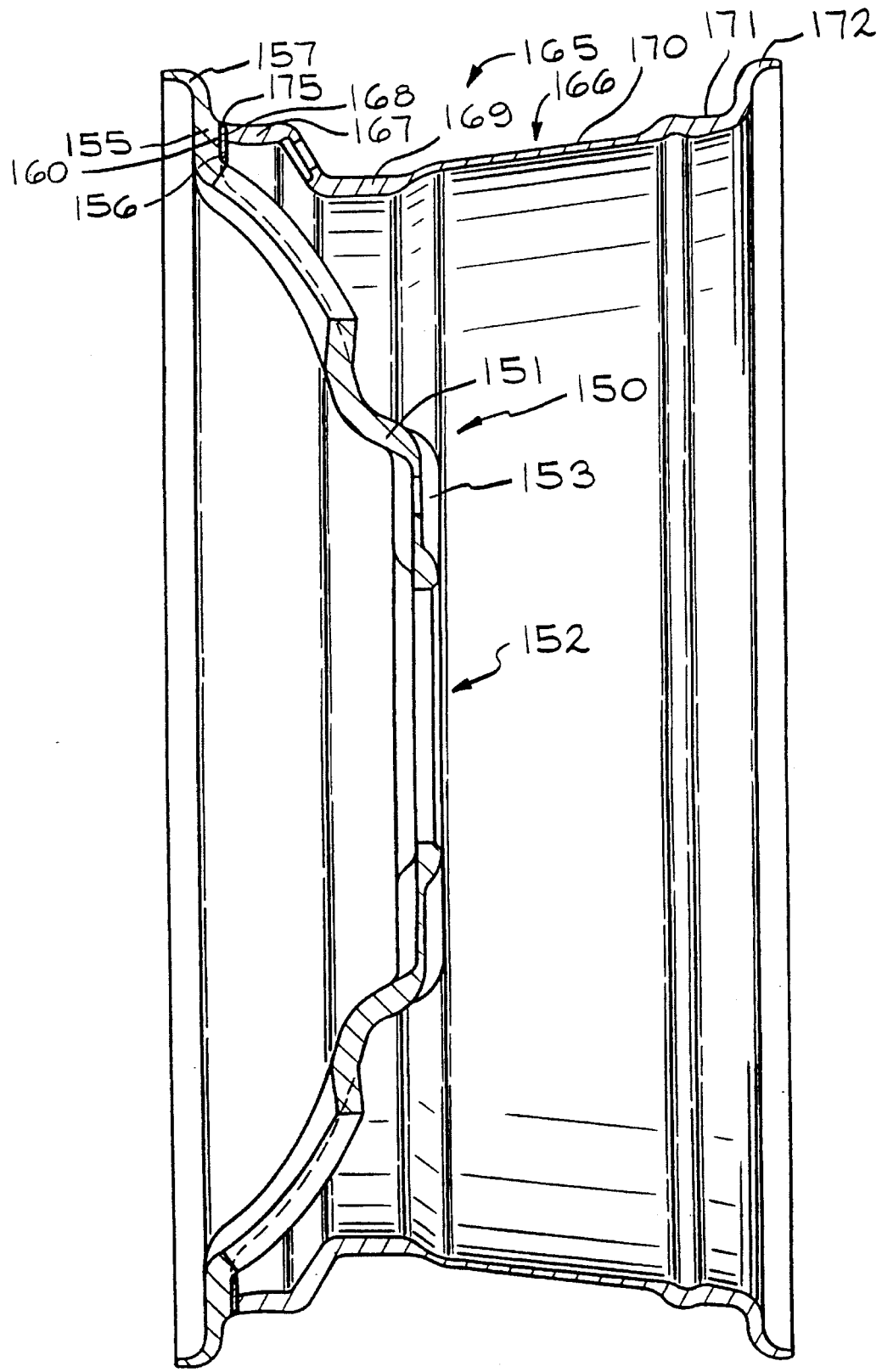
FIG. 9 shows a partial wheel rim welded to the wheel disc shown in FIG. 8.

Another embodiment of the thermally deposited weld anchor is illustrated in FIGS. 8 and 9. A sectional view of a full face wheel disc 150 is shown in FIG. 8. In the preferred embodiment, the wheel disc 150 is stamped from a sheet of aluminum or an alloy of aluminum, however, it will be appreciated that the wheel disc also can be cast or forged. Additionally, other metals or alloys than aluminum can be used to form the wheel disc 150. The wheel disc 150 includes a wheel hub 151 which has a central pilot hole 152 and a plurality of wheel stud holes 153, only one of which is shown, formed therethrough. The wheel disc 150 extends radially outward from the hub 151 to an annular wheel disc rim 155. The wheel disc rim 155 defines an annular inner radial surface 156 and is formed to include an outboard tire bead retaining flange 157.

An annular weld anchor 160 is formed on the annular inner surface 156 of the wheel disc rim 155 with a thermal spray gun 85, shown in phantom in FIG. 8. In the preferred embodiment, a ferrous powder is supplied to the thermal spray gun 85 for spraying to assure that the weld anchor 160 is compatible for welding the wheel disc 150 to a steel wheel rim. The thermal spray gun 85 can be held stationary while the wheel disc 150 is rotated about its axis to form the weld anchor 160.

A sectional view of an assembled full face vehicle wheel 165, which includes the stamped wheel disc 150 and a partial wheel rim 166, is show in FIG. 9. In the preferred embodiment, the partial wheel rim 166 is formed from steel stock by a conventional process, such as rolling or spinning. The partial wheel rim 166 includes an outboard tire bead seat 167 which has a radially outward directed end terminating in an annular shaped outer edge 168. The wheel rim 166 further includes a drop well 169. The outboard tire bead seat 167 is contiguous with an annular drop well 169. The drop well 169 extends axially to an annular inboard tire bead seat 171. A ring shaped inboard tire bead retaining flange 172 is formed on the inboard end of the inboard tire bead seat 171.

To assemble the vehicle wheel 165, the wheel rim 166 is positioned coaxially with the full face wheel disc 150 with the inboard tire bead retaining flange 172 parallel to the outboard tire bead retaining flange 157 and the wheel rim outer edge 168 abutting the weld anchor 160. The wheel rim 166 is secured to the wheel disc 150 with a single continuous circumferential butt weld 175 formed between the wheel rim outer edge 168 and the weld anchor 160. Alternately, a filler weld can be used to secure the wheel disc 150 to the wheel rim 166. It may desirable to grind or machine the weld 175 flush with the outer surface of the tire bead seat 167, however this step is optional. The weld 175 must be air tight to prevent air leakage when a tire is mounted upon the assembled wheel 165.

As in the previously described embodiments, it will be appreciated that the wheel rim 166 also can be formed from a light weight metal or alloy thereof which is dissimilar to the metal used to form the wheel disc 150. Additionally, while the invention has been illustrated with the weld anchor 160 formed on the wheel disc 150, the weld anchor can, as an alternative, be formed upon the wheel rim 166. For example, if the wheel disc 150 is formed from an aluminum alloy and the wheel rim from steel, a layer of aluminum or aluminum alloy can be sprayed onto the wheel rim outer edge 168 to form a weld anchor (not shown). The sprayed aluminum weld anchor would adhere to the steel wheel rim 166 and provide a compatible surface to which the wheel disc 150 can be welded.

It will be appreciated that, while the method for welding dissimilar metals has been described above for fabricating wheels, the method can be used to weld together any two components formed from dissimilar metals. To apply the method, a layer of metal compatible with one of the components would be thermally sprayed onto a cleaned portion of the surface of the other component to form a weld anchor. The second component would then be welded to the weld anchor.

As an alternate to welding the wheel disc to the wheel rim during fabrication of the above described bimetal wheels, the wheel disc can be brazed to the wheel rim. As before, the portion of the wheel rim surface that is to contact the wheel disc is cleaned of any din, oil and oxides. A layer of nonferrous filler metal which is compatible with both the metals used to form the wheel disc and wheel rim is thermally sprayed onto the cleaned portion of the wheel rim surface. The particular filler metal is selected depending upon the metals used to form the wheel disc and rim. For example, a copper-zirconium alloy or an aluminum alloy can be used as the filler metal to braze an aluminum wheel disc to a steel wheel rim. As described above, the thermal spraying causes the filler metal to bond to the wheel rim surface.

A portion of the surface of the wheel disc is cleaned of any dirt, oil and oxides. The cleaned surfaces of the wheel disc and rim can be coated with a flux, such as borax, to prevent formation of oxides during the brazing process. The wheel disc is positioned concentric with the wheel rim and with the cleaned portion of the wheel disc surface contacting the layer of filler metal to form a wheel assembly. For a full face wheel disc, the outboard tire bead retaining flange on the wheel disc is positioned parallel to the inboard tire bead retaining flange on the wheel rim. The wheel assembly is heated to a brazing temperature at which the filler metal melts, but which is below the melting temperatures of the metals forming the wheel disc and rim. The heating is typically done in a furnace with a brazing temperature in excess of 800° F. (427° C.). The melted filler metal forms a bond between the wheel disc and the wheel rim.

In the preferred embodiment, the wheel disc surface which is to be brazed is fitted closely to the corresponding wheel rim surface. For a bimetal wheel having the wheel disc disposed within the wheel rim, as illustrated in FIGS. 3 and 5, a close fit can be obtained by heating the wheel rim to expand the rim before inserting the wheel disc. The wheel disc is then inserted and the wheel rim cooled. The wheel rim contracts upon cooling to form a close fit with the filler metal clamped between the wheel rim surface and the wheel disc assure a strong brazed joint.

For bimetal wheels having a full face wheel disc joined to a partial wheel rim, as illustrated in FIGS. 7 and 9, the wheel disc and wheel rim can be mounted in a jig (not shown) prior to brazing. The jig includes means for clamping the disc and rim closely together such that the wheel disc fully contacts the layer of filler metal. The jig also maintains the wheel disc concentric with the wheel rim and the outboard and inboard tire bead retaining flanges parallel to one another. The jig and wheel assembly are heated to braze the wheel disc to the wheel rim.

While brazing has been described above with the filler metal being deposited on a surface of the wheel rim, it will be appreciated that the filler metal also can be deposited with a thermal spray gun on a surface of the wheel disc or on both the wheel rim and the wheel disc. It also will be appreciated that, while the method for brazing dissimilar metals has been described above for fabricating wheels, the method can be used to braze together any two components formed from dissimilar metals. To apply the method, a layer of filler metal compatible with both of the components is thermally sprayed onto a cleaned portion of the surface of one of the components. A portion of the surface of the other component is cleaned and positioned contacting the layer of filler metal. The two components are heated sufficiently to melt the filler metal, but not the components. Upon cooling, a brazed joint is formed between the two components.

The present invention also contemplates thermally depositing a layer of metal onto a portion of the surface of a wheel rim and then casting or forging a wheel disc onto the wheel rim with the wheel disc covering a portion of the sprayed metal layer. The wheel rim and wheel disc would be formed from dissimilar metals. As described above, the metal sprayed onto the wheel rim would be selected to be compatible with the metal used to form the wheel disc. Accordingly, the wheel rim would be securely fused to the thermally deposited metal layer.

A fragmentary sectional view of a bimetal vehicle wheel 180 which is formed by the casting process described above is shown in FIG. 10. The wheel 180 includes a full face wheel disc 181 which, in the preferred embodiment, is formed from a light weight metal or alloy thereof by a conventional casting or forging process. The wheel disc 181 includes a center hub 182 having a pilot hole 182 and a plurality of wheel stud holes 184, one of which is shown, formed therethrough. A plurality of spokes 185, one of which is shown, extend radially from the hub 182 to an annular wheel disc rim 186. The wheel disc rim 186 includes an outboard tire bead retaining flange 187 which is formed adjacent to an outboard tire bead seat 188. The tire bead seat 188 extends axially to a drop well wall 189 and an annular portion of a drop well 190. The drop wheel portion 190 extends in an inward axial direction from the wheel disc rim 186.

Figure 10:
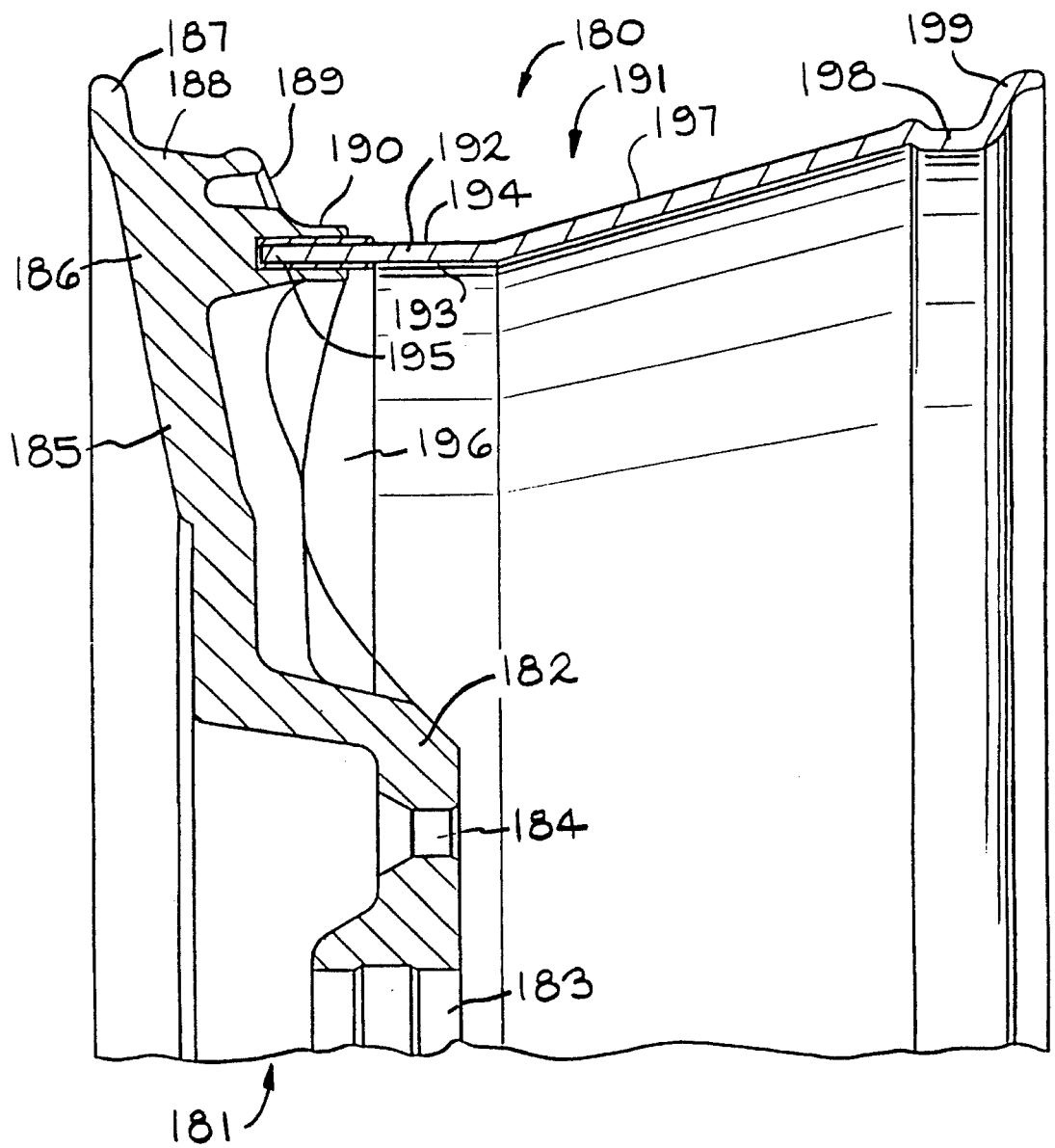
FIG. 10 is a fragmentary, sectional view of a full face wheel fabricated in accordance with the invention.

The wheel 180 also includes a partial wheel rim 191 which, in the preferred embodiment, is formed from steel by a conventional process, such as described above. It will be appreciated, however, that other metals, which are different from the metal used for the wheel disc 181, can be used to form the wheel rim 191. The outboard end of the wheel rim 191 forms a portion of a drop well 192. The drop well 192 has inner and outer surfaces 193 and 194 and terminates in an annular shaped edge 195. As illustrated in FIG. 10, the outboard portion of the rim drop well 192 includes a surface layer 196 of a metal. The metal used to form the metal layer 196 is selected to be compatible for forming a bond with the metal of the wheel disc 181. For example, if the wheel disc 181 is aluminum, the metal layer 196 is formed from aluminum or an alloy of aluminum. The metal layer 196 extends axially from the rim edge 195 across a portion of the inner and outer surfaces 193 and 194 of the rim drop well 192. The outboard end of the rim drop well 192 extends into and is secured to the wheel disc drop well 190. The wheel rim 191 also includes an annular leg portion 197, an inboard tire bead seat 198 and an inboard tire bead retaining flange 199.

Figure 11:
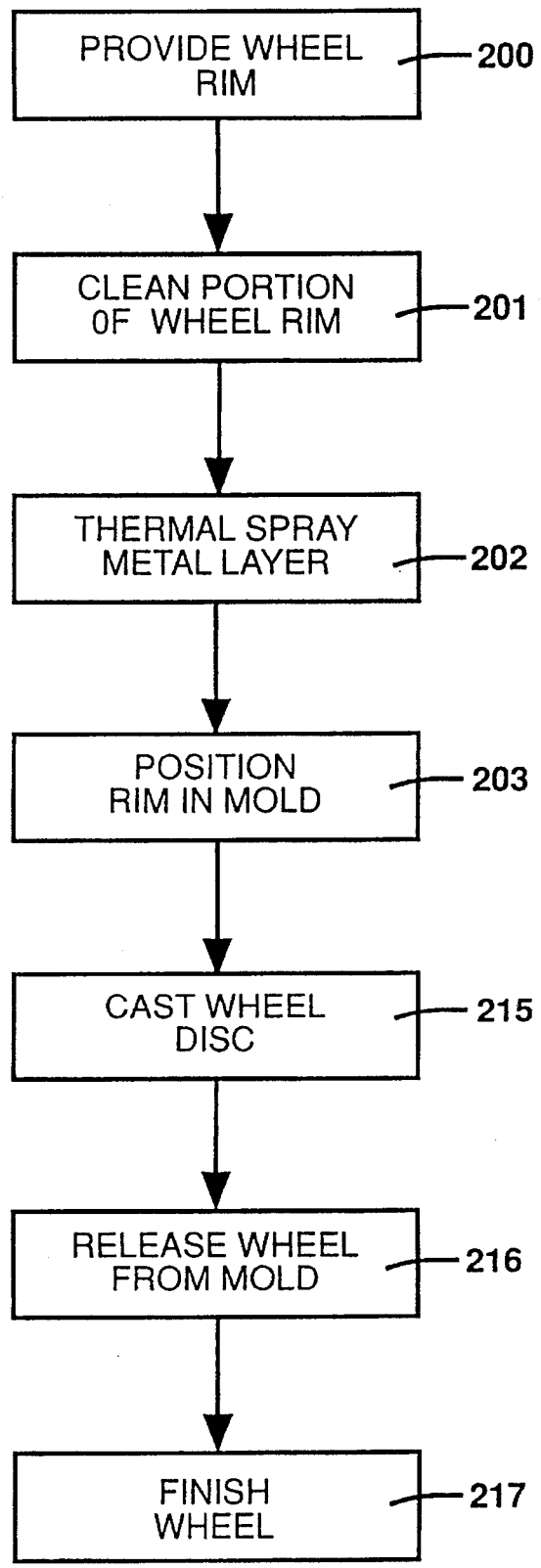
FIG. 11 is a flow chart of the method for fabricating the wheel shown in FIG. 10.

The method used to fabricate the wheel 180 is illustrated in the flow chart shown in FIG. 11. In functional block 200, a partial wheel rim without the metal layer 196 is provided. The outboard end portion of the wheel rim is prepared, in functional block 201, for the thermal deposition of the metal layer 196 by cleaning the surfaces to be covered in the manner described above. Metal compatible with the metal forming the wheel disc 181 is thermally sprayed onto the cleaned inner and outer surfaces 193 and 194 in functional block 202 to form the metal layer 196. As described above, the thermal spray process bonds the sprayed metal securely to the surface of the wheel rim. In the preferred embodiment, an arc plasma spray gun is used to deposit the metal, however, it will be appreciated that other types of thermal spray guns can be used. Application of the metal layer 196 to the wheel rim produces the wheel rim 191 illustrated in FIG. 10. While the metal layer 196 has been described as being formed on both the inner and outer surfaces 193 and 194 of the rim drop well 192, it will be appreciated that the metal layer 196 also can be formed on only one of the surfaces 193 and 194.

Figure 12:
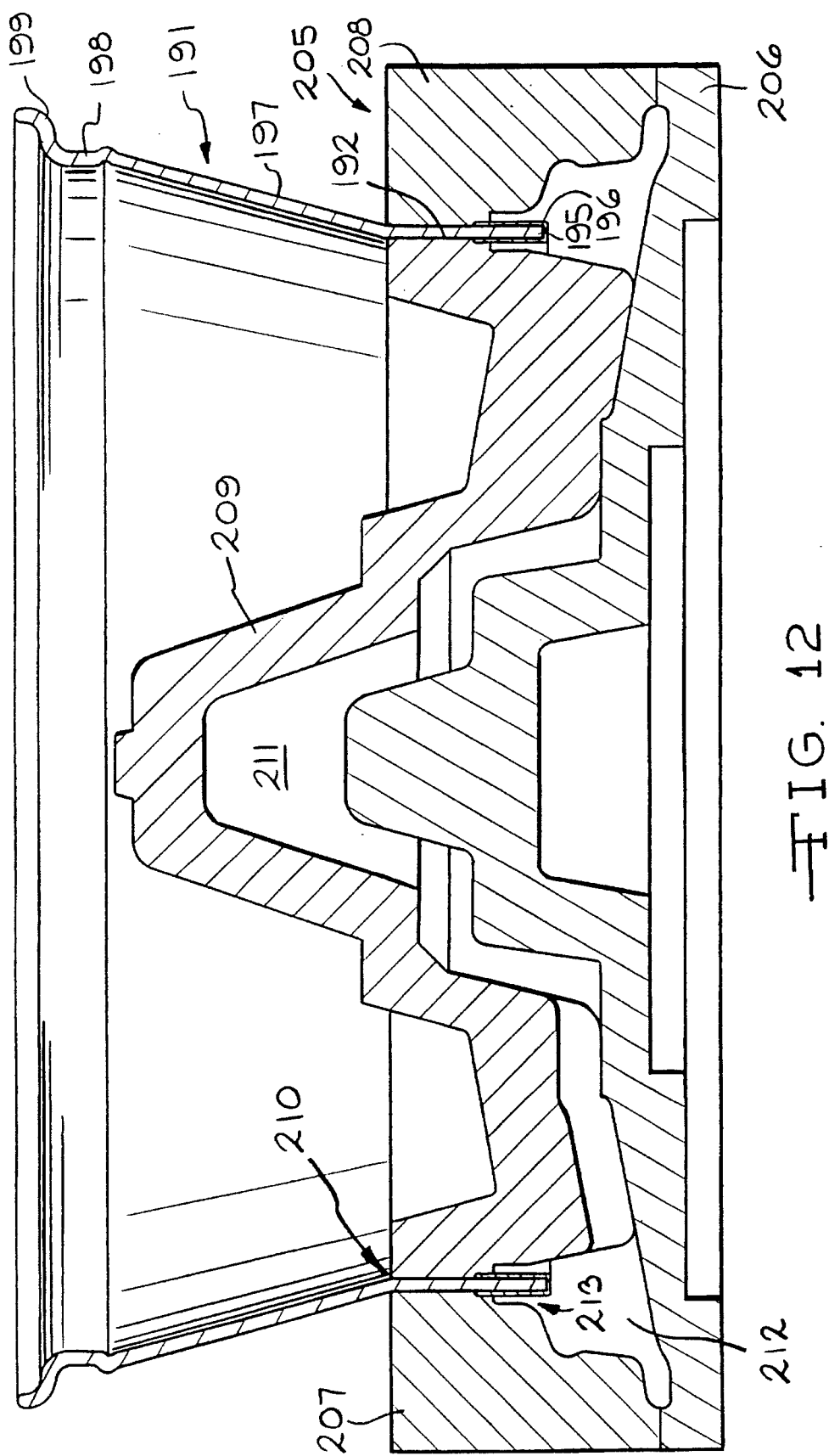
FIG. 12 is a sectional view of a wheel mold for casting the wheel disc shown in FIG. 10.

In functional block 203, the wheel rim 191 is positioned relative to a multi-piece wheel disc mold 205, as illustrated in the sectional view of the mold 205 and wheel rim 191 shown in FIG. 12. The wheel disk mold 205 includes a bottom core 206 which supports a pair of retractable side cores 207 and 208. An axially retractable top core 209 is disposed between the side cores 207 and 208. When the mold 205 is closed, as illustrated in FIG. 12, an annular opening 210 is formed between the side cores 207 and 208 and the top core 209 and a mold cavity 211 is defined for casting the full face wheel disc 181. The mold cavity 211 includes an annular rim portion 212 which corresponds to the wheel disc rim 186. The cavity rim portion 212 includes an annular cavity 213 extending axially therefrom which corresponds to the wheel disc drop well portion 190.

To position the wheel rim 191 relative to the mold 205, the side cores 207 and 208 and the top core 209 are retracted. The wheel rim 191 is then positioned with the drop well 192 extending over the outer circumference of the top core 209. The side cores 207 and 208 are extended towards the top core 209, clamping the wheel rim 191 in position on the top core 209. The rim drop well 192 forms a seal between the side cores 207 and 208 and the top core 209. The top core 209 and side cores 207 and 208 are extended towards the bottom core 206 to close the mold 209. When the mold 205 is closed, as shown in FIG. 12, the rim drop well 192 extends through the annular opening 210 and the end portion of the wheel rim 191, which includes the metal coating 196, extends into the annular cavity 213. The wheel rim 191 is positioned coaxially with the mold cavity 211 and with the inboard tire bead retaining flange 199 parallel to the die cavity surface that defines the outboard tire bead retaining flange.

In functional block 215, molten metal is introduced to the mold cavity 211 through a sprue (not shown) to cast the wheel disc 181. The molten metal fills the annular mold cavity portions 212 and 213, covering and partially melting the metal layer 196. As the molten metal cools to form the wheel disc 181, the wheel disc drop well portion 190 is physically bonded to the metal layer 196 on the wheel rim 191, securely attaching the wheel rim 191 to the wheel disc 181. The metal in the wheel disc drop well portion 190 contracts as it cools, forming an air tight seal between the wheel rim 191 and the wheel disc 181.

After the wheel disc 181 has cooled sufficiently, the top and side cores 209, 207 and 208 are retracted allowing removal of the complete wheel 180 from the bottom core 206, as indicated in functional block 216 in FIG. 11. In functional block 217, conventional finishing operations are applied to the wheel 180 as needed. Such operations can include machining the wheel disc 181 to final shape and drilling the wheel stud holes 184 through the wheel disc hub 182. Additionally, one or more of the wheel surface finishing operations described above can be applied to the wheel 180.

As indicated above, the wheel 180 also can be formed with a forged wheel disc 181. The forging process is illustrated in the flow chart shown in FIG. 13. The initial three steps of the process are the same as described above for the cast wheel disc. A partial wheel rim is provided in functional block 220 and prepared by cleaning the outboard portion of the drop well in functional block 221. In functional block 222, metal compatible with the metal used to form the wheel disc 181 is thermally sprayed onto the outboard portion of the wheel rim to form the metal layer 196.

Figure 14:
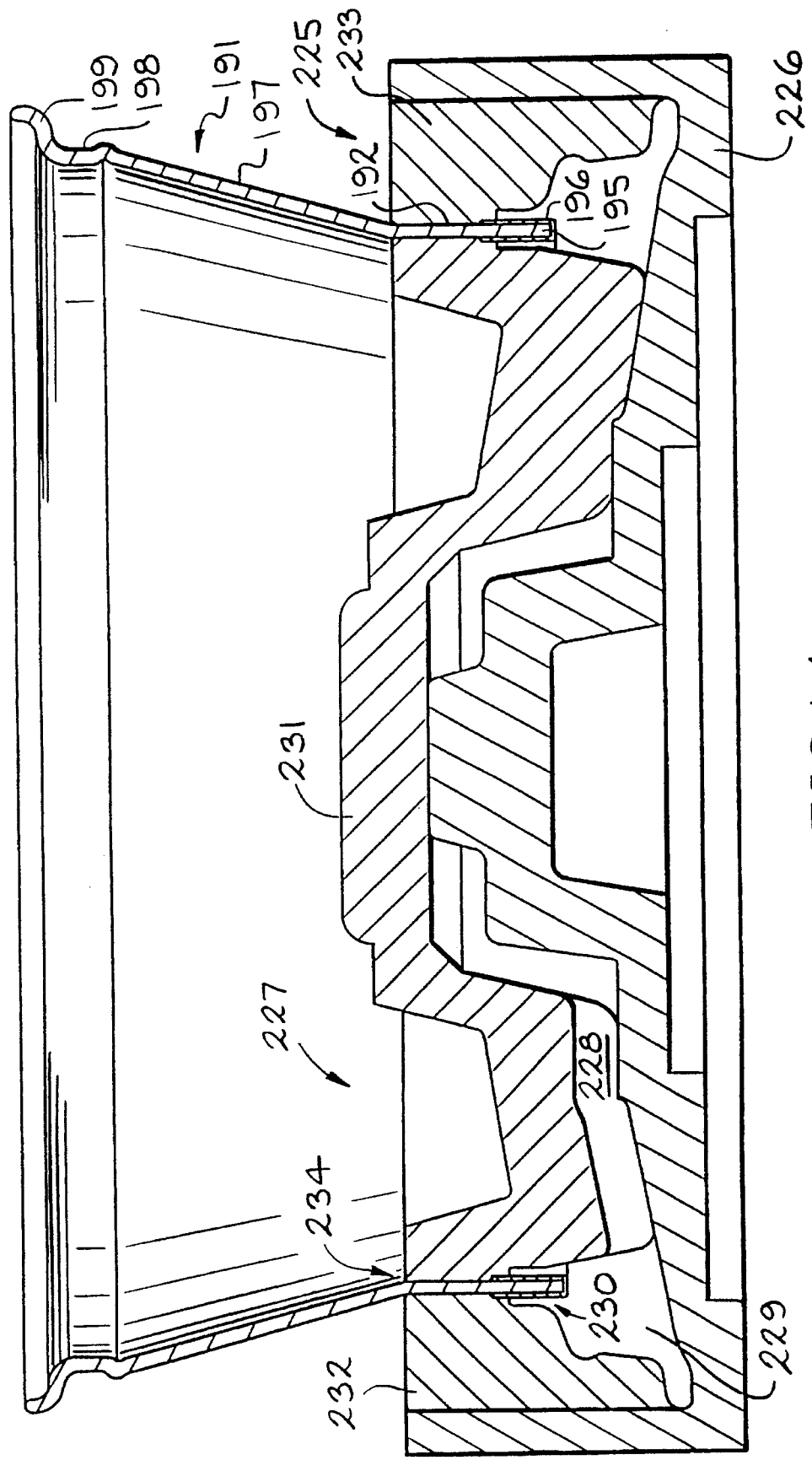
FIG. 14 is a sectional view of a set of wheel dies for semi-solid forging the wheel disc shown in FIG. 10.

In functional block 223, the prepared wheel rim 191 is mounted upon a set of wheel disc dies 225, as shown in FIG. 14. The die set 225 includes a lower die 226 and a multi-piece upper die 227. The upper die 227 is axially movable relative to the lower die 226 between closed and open positions by a conventional mechanism (not shown). In the closed position, the upper die 227 extends into and cooperates with the lower die 226 to define a die cavity 228, as illustrated in FIG. 14. The die cavity 228 has an annular rim portion 229 which corresponds to the wheel disc rim 186. The cavity rim portion 229 includes an annular cavity 230 extending axially therefrom which corresponds to the wheel disc drop well portion 190. In the open position, the upper die 227 is completely withdrawn from the lower die 226.

The upper die 227 includes a center element 231 which is disposed between a pair of movable side elements 232 and 233. When the upper die 227 is in the closed position, as shown in FIG. 14, the side elements 232 and 233 are extended towards the center element 231, defining an annular opening 234 therebetween. When the upper die 227 is in the open position, the side elements 232 and 233 can be retracted from the center element 231. For clarity, the mechanism for extending and retracting the side elements 232 and 233 relative to the center element 231 has been omitted from FIG. 14.

To mount the wheel rim 191 upon the upper die 227, the upper die 227 is withdrawn from the lower die 226 and the side elements 232 and 233 retracted from the center element 231. The wheel rim 191 is then positioned with the drop well 192 extending over the outer circumference of the center element 231. The side elements 232 and 233 are extended towards the center element 231, clamping the wheel rim 191 in position on the upper die 227. The rim drop well 192 forms a seal between the side elements 232 and 233 and the center element 231. When the upper die 227 is closed, as shown in FIG. 18, the rim drop well 192 extends through the annular opening 234 and the end portion of the wheel rim 191, which includes the metal coating 196, extends into the cavity annular portion 230. The wheel rim 191 is positioned coaxially with the die cavity 228 and with the inboard tire bead retaining flange 199 parallel to the die cavity surface that defines the outboard tire bead retaining flange.

Figure 13:
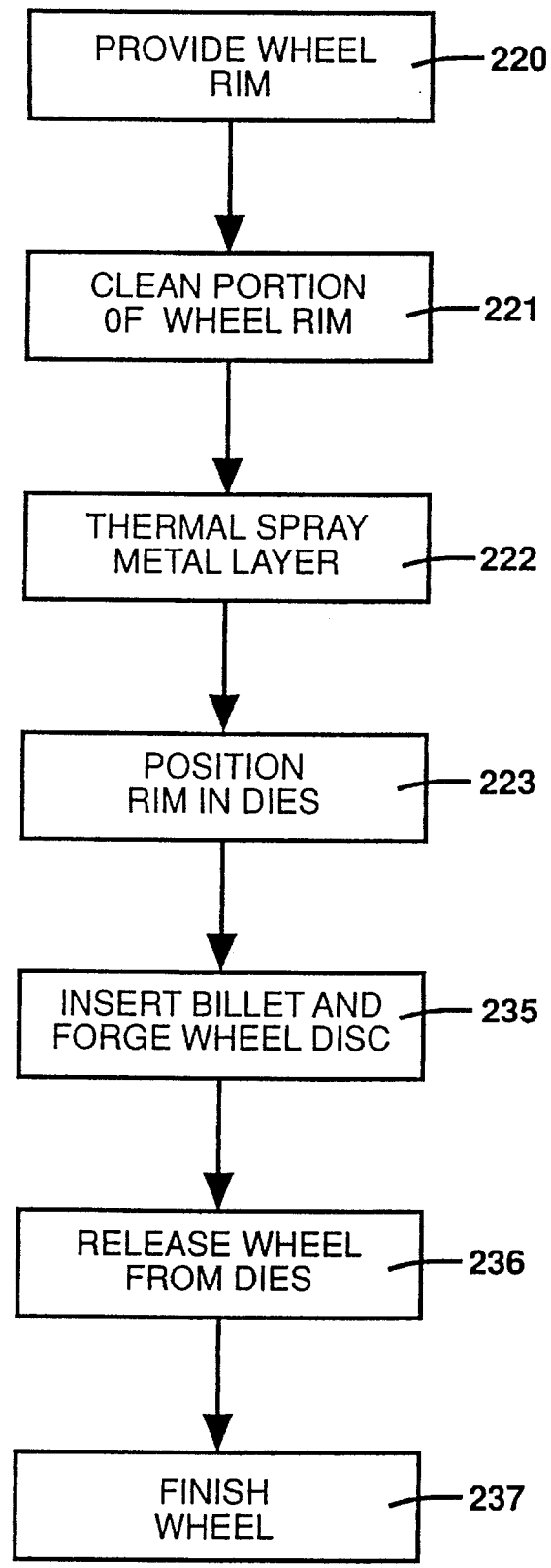
FIG. 13 is a flow chart of an alternate method for fabricating the wheel shown in FIG. 10.

After the wheel rim 191 is mounted on the upper die 227, the dies are ready for forging the wheel disc 181, as indicated in functional block 235 in FIG. 13. A conventional forging process, such as squeeze forging, is used. The squeeze forging process includes heating a disk shaped billet of metal (not shown) to a temperature that is slightly less than the melting temperature of the metal billet. The heated billet is placed between the upper and lower dies 226 and 227 and the upper die 227 is pressed axially into the lower die 226. As the dies are pressed together, the metal billet is squeezed into the die cavity 228, filling the die cavity annular portions 229 and 230. The heated metal flows over the end portion of the drop well 192 and into contact with the metal layer 196. The metal is sufficiently hot to partially melt the layer 196. As the molten metal cools to form the wheel disc 181, the wheel disc drop well portion 190 is physically bonded to the metal layer 196 on the wheel rim 191, securely attaching the wheel rim 191 to the wheel disc 181. The metal in the wheel disc drop well 190 contracts as it cools, forming an air tight seal between the wheel rim 191 and the wheel disc 181.

After the wheel disc 181 has cooled sufficiently, the upper die 227 is moved to the open position, withdrawing the wheel 180 from the lower die 226. The side elements 232 and 233 are retracted from the center element 231, allowing removal of the wheel 180 therefrom, as indicated in functional block 236 in FIG. 13. In functional block 237, finishing operations are applied to the wheel 180 as needed. For example, such operations can include machining the wheel disc to final shape and drilling the wheel stud holes 184 through the wheel disc hub 182. Additionally, one or more of the wheel surface finishing operations described above can be applied to the wheel 180.

Figure 15:
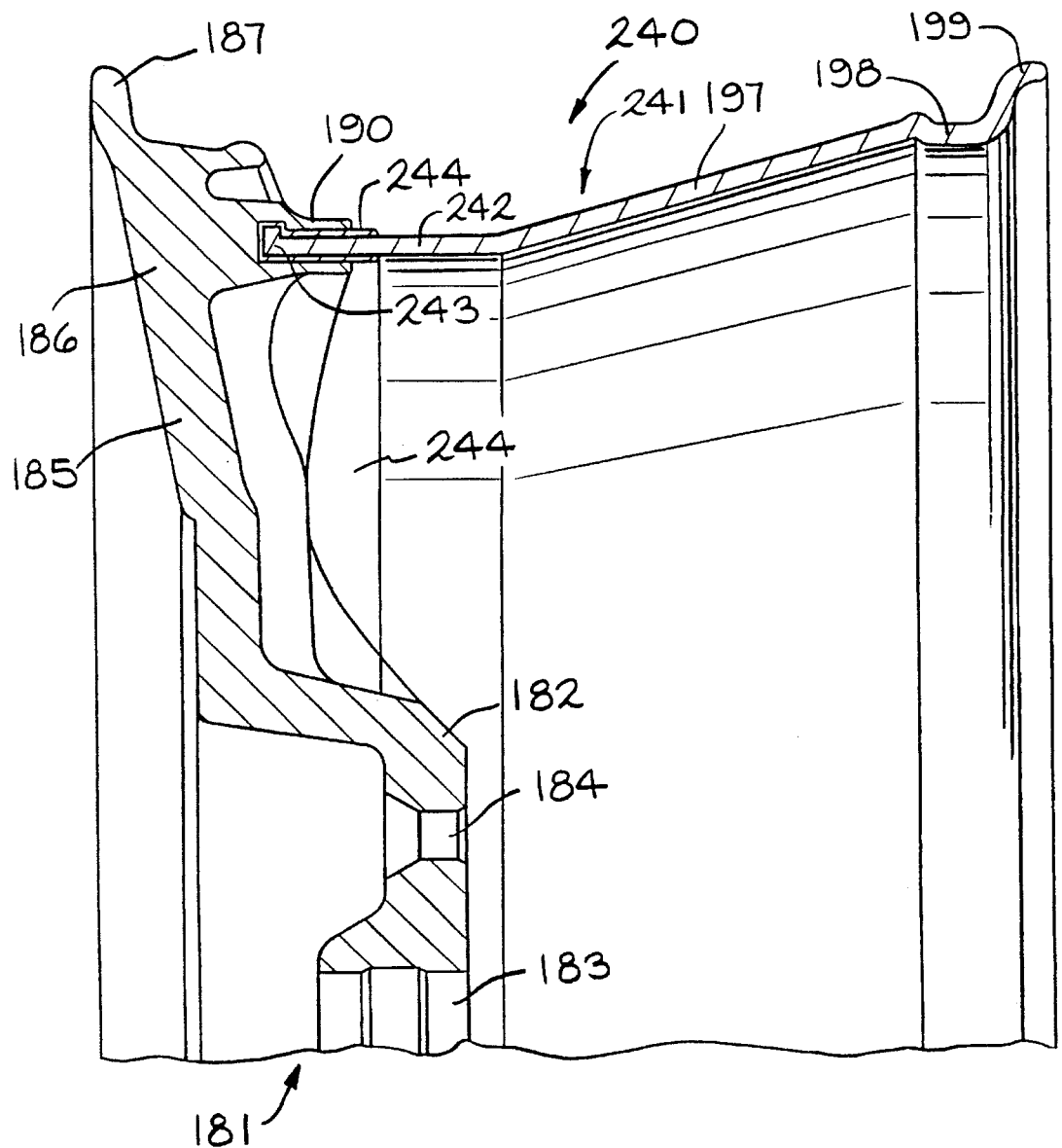
FIG. 15 is a fragmentary sectional view of an alternate embodiment of the bimetal wheel shown in FIG. 10.

A fragmentary sectional view of an alternate embodiment of a bimetal full face vehicle wheel 240 is shown in FIG. 15. Portions of the wheel 240 which are identical to corresponding portions of the previously described wheel 180 are indicated by the same numerical designator. The wheel 240 includes a wheel disc 181 which is formed by a conventional method, such as casting or forging, on the outboard end of a partial wheel rim 241, as described above. The outboard end of the wheel rim 241 includes a portion of a drop well 242. The drop well 242 includes a radial flange 243, which is shown in FIG. 15 at the axial outboard end of the drop well 242 extending in a radially outward direction. The flange 243 anchors the outboard end of the wheel rim 241 in the drop well portion 190 of the wheel disc rim 186. It will be appreciated that while the flange 243 is shown extending in an outward radial direction, the flange can also be formed extending in an inward radial direction. Similarly, the flange 243 need not be formed on the axial end of the wheel rim 241, but can be formed on an intermediate portion of the drop well 242. Metal compatible with the metal used to form the wheel disc 181 is thermally sprayed over the flange 243 and the end portion of the drop well 242 to form a metal layer 244. As described above, when the wheel disc 181 is formed on the end of the wheel rim 241, the coating 244 bonds to the wheel disc 181 to form a secure air-tight seal between the wheel rim 241 and the wheel disc 181.

Figure 16:
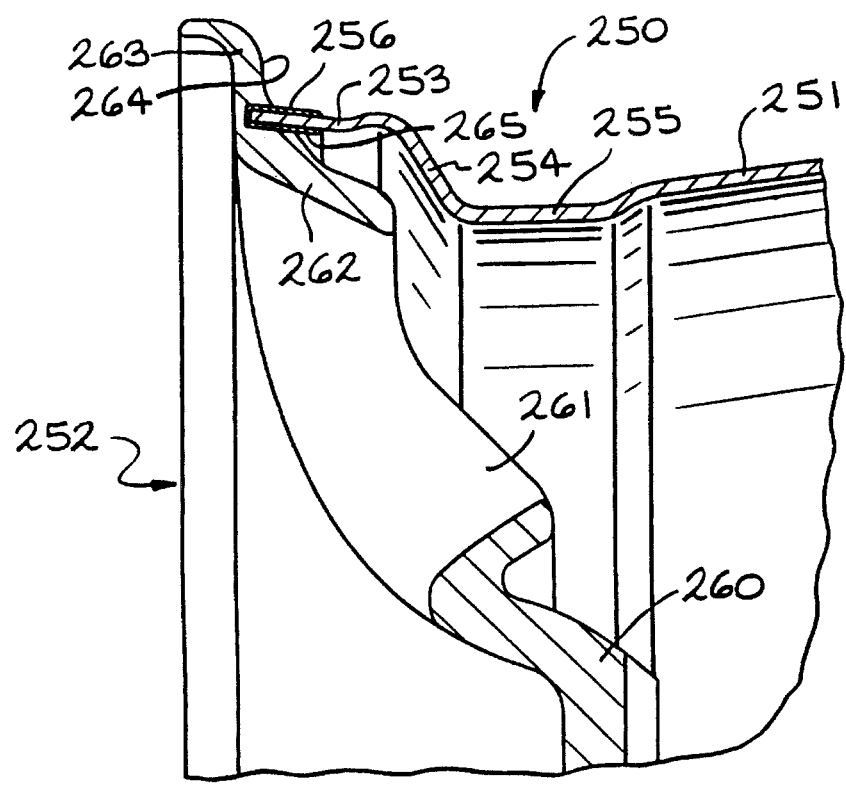
FIG. 16 is a fragmentary sectional view of another embodiment of the wheel shown in FIG. 10.

A fragmentary sectional view of another bimetal full face vehicle wheel 250 fabricated in accordance with the invention is shown in FIG. 16. The wheel 250 includes a partial wheel rim 251 and a full face wheel disc 252. The wheel rim 251 has an outboard end formed as an outboard tire bead seat 253. The outboard tire bead seat 253 is connected by a drop well wall 254 to a drop well 255. In the preferred embodiment, the wheel rim 251 is formed from steel by a conventional process, as described above. As also described above, metal compatible with the metal used to form the wheel disc 252 is thermally sprayed onto the outboard end of the wheel rim 251 to form a metal layer 256. As shown in FIG. 16, the metal layer 256 extends axially inward from the outboard end of the wheel rim 251 over a portion of both the inner and outer surfaces of the tire bead seat 253. While the metal layer 256 is shown on both the inner and outer surfaces of the bead seat 253, it will be appreciated that the metal layer 256 also can be formed on only the inner surface. The thermal spray process provides a strong bond between the metal layer 256 and the wheel rim 251.

The full face wheel disc 252 includes a center hub 260 connected by a plurality of radial spokes 261, one of which is shown, to an annular wheel disc rim 262. The wheel disc rim 262 includes an outboard tire bead retaining flange 263 which defines a radial inboard surface 264. The radial surface 264 extends inwardly to an annular shoulder 265 which extends axially therefrom.

The wheel disc 252 is formed on the outboard end of the partial wheel rim 251 by a conventional process, such as casting or forging, as described above. During the wheel disc forming process, the wheel disc rim shoulder 264 is formed in supporting contact with the inside surface of the wheel rim outboard tire bead seat 256. Furthermore, the heated metal forming the wheel disc 252 bonds to the metal coating 256 on the wheel rim bead seat 253 to form a secure and air-tight bond between the wheel rim 251 and the wheel disc 252.

Figure 17:
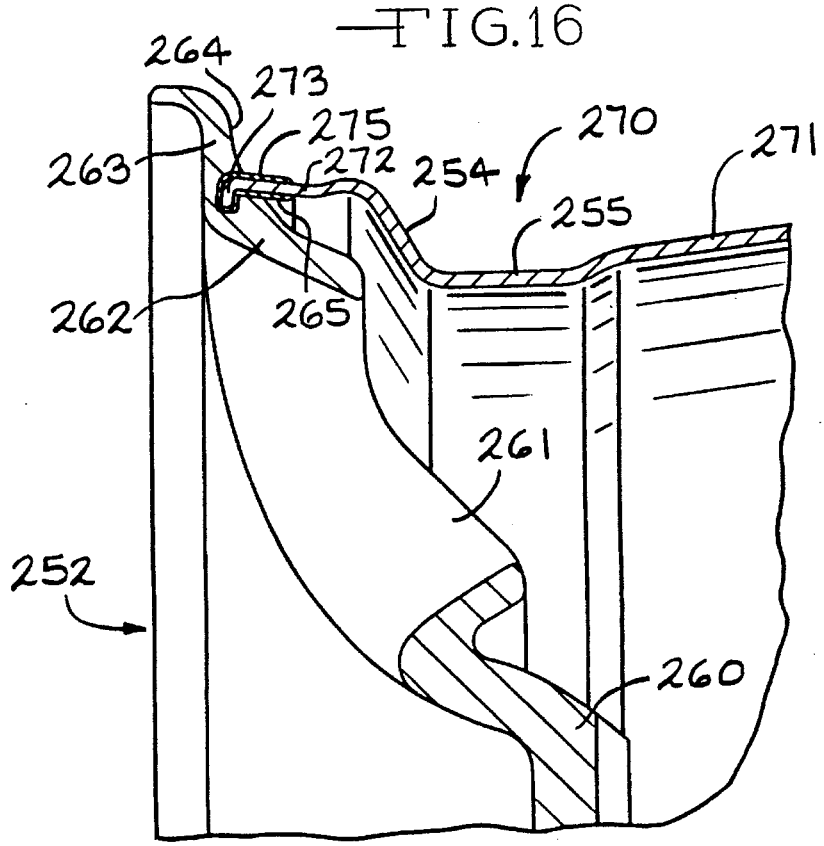
FIG. 17 is a fragmentary sectional view of an alternate embodiment of the wheel shown in FIG. 16.

A fragmentary sectional view of an another alternate embodiment of a bimetal full face vehicle wheel 270 is shown in FIG. 17. Portions of the wheel 270 which are identical to corresponding portions of the previously described wheel 250 are indicated by the same numerical designator. The wheel 270 includes a partial wheel rim 271 and a full face wheel disc 252. The wheel rim 271 has an outboard end formed as an outboard tire bead seat 272. The outboard tire bead seat 272 includes a radial flange 273, which is shown in FIG. 15 at the axial outboard end thereof extending in a radially inward direction. The flange 273 anchors the outboard end of the wheel rim 271 in the wheel disc rim 262. It will be appreciated that, while the flange is shown formed on the axial end of the wheel rim 271, it also can be formed on an intermediate portion of the tire bead seat 272. Similarly, the flange can be formed extending in an outward radial direction. Metal compatible with the metal used to form the wheel disc 252 is thermally sprayed over the flange 273 and the inner and outer surfaces of the tire bead seat 272 to form a metal layer 275. While the metal layer 275 is shown on both the inner and outer surfaces of the bead seat 272, it will be appreciated that the metal layer 275 also can be formed on only the inner surface. The thermal spray process provides a strong bond between the metal layer 275 and the wheel rim 271. As described above, when the wheel disc 252 is formed on the outboard end of the wheel rim 271, the metal layer 275 bonds to the wheel disc 252 to form a secure air-tight bond between the wheel rim 271 and the wheel disc 252.

It will be appreciated that while the method for attaching dissimilar metals components has been described above for fabricating vehicle wheels, the method can be used to join together any two components formed from dissimilar metals. To apply the method, metal compatible with one of the components would be thermally sprayed onto a cleaned portion of the surface of the other component to form a metal layer. The second component would then be cast or forged over the metal layer.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for attaching a wheel disc formed from a first metal to a wheel rim formed from a second metal, the second metal being different from the first metal, the method comprising the steps of:

(a) providing the wheel disc and wheel rim;

(b) spraying a layer of brazing filler metal which is compatible with the first metal and the second metal onto a portion of a surface of one and only one of the wheel disc and wheel rim with a thermal spray gun;

(c) positioning the wheel disc adjacent to the wheel rim with the layer of brazing material therebetween; and (d) heating a portion of the wheel disc and the wheel rim sufficiently to braze the wheel disc to the wheel rim.

2. The method according to claim 1 wherein the metal sprayed in step (b) is a brazing filler metal that is compatible with the first metal and step (c) includes positioning the first component with the sprayed surface of the first component contacting a portion of the surface of the second component and further wherein step (c) includes, subsequent to positioning the first component, heating the two components sufficiently to braze the first component to the second component.

3. A method for attaching a wheel disc formed from a first metal to a wheel rim formed from a second metal, the second metal being different from the first metal, the method comprising the steps of:

(a) providing the wheel disc and the wheel rim;

(b) spraying a layer of metal onto a portion of a surface of one of the wheel disc and the wheel rim with a thermal spray gun to form a weld anchor, the sprayed metal being compatible with the metal forming the other of the wheel disc and the wheel rim;

(c) positioning the wheel disc adjacent to the wheel rim with the weld anchor therebetween; and (d) welding the wheel disc to the wheel rim.

4. The method according to claim 3 wherein the wheel disc is a full face wheel disc having an inboard surface and the wheel rim is a partial wheel rim having an outboard annular edge and further wherein step (b) includes spraying the metal onto the inboard wheel disc surface to form the weld anchor.

5. The method according to claim 4 wherein step (c) includes positioning the wheel rim concentric to the wheel disc with the wheel rim outboard annular edge adjacent to the annular weld anchor and step (c) further includes welding the wheel rim outer annular edge to the weld anchor.

6. The method according to claim 5 wherein the weld is a continuous circumferential weld which forms an air tight seal between the wheel rim and the wheel disc.

7. The method according to claim 4 wherein the partial wheel rim includes an inboard tire bead retaining flange and the wheel disc includes an outboard tire bead retaining flange and further wherein step (c) includes positioning the wheel rim with the inboard tire bead retaining flange parallel to the wheel disc outboard tire bead retaining flange.

8. The method according to claim 3 wherein the wheel rim is a partial wheel rim having an outboard annular edge and the wheel disc is a full face wheel disc having an inboard surface and further wherein step (b) includes spraying the metal onto the wheel rim outboard annular edge to form the weld anchor.

9. The method according to claim 3 wherein the wheel rim has an outboard portion that defines an inner surface and the wheel disc includes a center hub having a plurality of spokes extending radially therefrom to an annular outer portion and further wherein step (b) includes spraying the metal onto the inner surface of the outboard portion of the wheel rim to form the weld anchor and step (c) includes positioning the wheel disc outer portion adjacent to the weld anchor.

10. The method according to claim 9 wherein step (b) also includes machining the sprayed layer.

11. The method according to claim 3 wherein the wheel rim has an outboard portion that defines an inner surface and the wheel disc includes a center hub having a plurality of spokes extending radially therefrom, each spoke terminating in an outer spoke end and further wherein step (b) includes spraying the metal onto the inner surface of the outboard portion of the wheel rim to form the weld anchor and step (c) includes positioning the wheel disc within the outboard portion of the wheel rim with the spoke ends adjacent to the weld anchor.

12. The method according to claim 3 wherein the wheel disc has a radially outer portion and further wherein step (b) includes spraying the metal onto the wheel disc outer portion to form the weld anchor.

* * * * *

UNITED STATES PATENT AND TRADEMARK OFFICE
CERTIFICATE OF CORRECTION

PATENT NO. : 5,526,977
DATED : June 18, 1996
INVENTOR(S) : Daniel C. Wei

It is certified that error appears in the above-indentified patent and that said Letters Patent is hereby corrected as shown below:

Column 15, claim 2, lines 45-53, should be deleted.

Signed and Sealed this

Twenty-ninth Day of October 1996

Attest:

BRUCE LEHMAN

Attesting Officer     Commissioner of Patents and Trademarks